US012678757B2

(12) United States Patent

Mort et al.

(10) Patent No.: US 12,678,757 B2

(45) Date of Patent: Jul. 14, 2026

(54) MATERIAL MIXING AND GRANULATION SYSTEMS AND METHODS

(71) Applicant: Purdue Research Foundation, West Lafayette, IN (US)

(72) Inventors: Paul R. Mort, Lafayette, IN (US); Nicole K. Balog, West Lafayette, IN (US); Simon Ray, Brownsville, TX (US); Kayli L. Henry, Lafayette, IN (US); Carl R. Wassgren, West Lafayette, IN (US); Leonard Joseph Connors, Omaha, NE (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 50 days.

(21) Appl. No.: 18/642,292

(22) Filed: Apr. 22, 2024

(65) Prior Publication Data

US 2024/0350993 A1 Oct. 24, 2024

Related U.S. Application Data

(60) Provisional application No. 63/460,872, filed on Apr. 20, 2023.

(51) Int. Cl.
| | |
|---|---|
| B01F 27/112 | (2022.01) |
| B01F 27/072 | (2022.01) |

(Continued)

(52) U.S. Cl.
CPC ............. B01J 2/10 (2013.01); B01F 27/0722 (2022.01); B01F 27/0724 (2022.01);

(Continued)

(58) Field of Classification Search
CPC .............. B01F 27/0722; B01F 27/0724; B01F 27/112; B01F 27/62; B01F 27/625;

(Continued)

(56) References Cited

U.S. PATENT DOCUMENTS

| | | | | |
|---|---|---|---|---|
| 5,801,205 | A | * | 9/1998 | Nishibori .............. B01F 35/751 |
| | | | | 521/137 |
| 6,079,215 | A | | 6/2000 | Wisniewski |

(Continued)

FOREIGN PATENT DOCUMENTS

| | | |
|---|---|---|
| EP | 0 219 471 A2 | 4/1987 |
| EP | 2 864 030 B1 | 11/2019 |

OTHER PUBLICATIONS

Rao, R. R. et al., Metamorphosis of Twin Screw Extruder-Based Granulation Technology: Applicaitons Focusing on Its Impact on Conventional Granulation Technology. AAPS Pharm. Sci. Tech. (2022) 23:24; doi: 10.1208/s12249-021-02173-w; published online Dec. 14, 2021.

(Continued)

*Primary Examiner* — Leo B Tentoni

(74) *Attorney, Agent, or Firm* — Purdue Research Foundation

(57) ABSTRACT

A mixing assembly includes a mixing basin, first and second pluralities of mixing paddles, and at least one motor. The mixing basin includes first and second parallel shafts extending therethrough. Each of the first and second pluralities of mixing paddles are positioned in an interior of the mixing basin. Each paddle of the first plurality of mixing paddles is coupled with the first shaft and configured to rotate about a first axis and each paddle of the second plurality of mixing paddles is coupled with the second shaft and configured to counter-rotate about a second axis. The counter-rotating mixing paddles are spaced apart to define a shear gap (Continued)

therebetween, and the motor is operable to drive the counter-rotation of the mixing paddles.

18 Claims, 33 Drawing Sheets

(51) Int. Cl.

| | |
|---|---|
| *B01F 27/60* | (2022.01) |
| *B01F 27/706* | (2022.01) |
| *B01F 29/64* | (2022.01) |
| *B01F 35/32* | (2022.01) |
| *B01F 35/75* | (2022.01) |
| *B01J 2/10* | (2006.01) |
| *B01J 2/12* | (2006.01) |
| *B01J 19/18* | (2006.01) |
| *B01J 19/28* | (2006.01) |
| *B29B 7/18* | (2006.01) |
| *B29B 7/46* | (2006.01) |
| *B29B 7/94* | (2006.01) |
| *B29C 67/02* | (2017.01) |

(52) U.S. Cl.
CPC ............ *B01F 27/62* (2022.01); *B01F 27/625* (2022.01); *B01F 35/3204* (2022.01); *B01F 35/3211* (2022.01); *B01F 35/751* (2022.01)

(58) Field of Classification Search
CPC ........ B01F 27/706; B01F 29/64; B01F 35/32; B01F 35/3204; B01F 35/3211; B01F 35/751; B01J 2/10; B01J 2/12; B01J 19/18; B01J 19/28; B29B 7/18; B29B 7/46; B29B 7/94; B29C 67/02
USPC ........ 264/117, 310, 311; 425/200, 204, 209, 425/222; 366/83, 97, 224, 246, 297, 348; 23/313 R
See application file for complete search history.

(56) References Cited

U.S. PATENT DOCUMENTS

| | | | |
|---|---|---|---|
| 9,585,412 B2 | 3/2017 | Corrigan | |
| 2008/0159067 A1* | 7/2008 | Hansen | ...................... B01J 2/10 366/348 X |
| 2019/0321795 A1 | 10/2019 | Lucon | |

OTHER PUBLICATIONS

Bandari, S. et al., Continuous Twin Screw Granulation—An advanced alternative granulation technology for use in the pharmaceutical industry. Int. J. Pharm., Apr. 30, 2020, vol. 580: 119215; doi: 10.1016/j.ijpharm.2020.119215.

\* cited by examiner

MATERIAL MIXING AND GRANULATION SYSTEMS AND METHODS

CROSS-REFERENCE TO RELATED APPLICATIONS

This application is related to and claims the priority benefit of U.S. Provisional Patent Application No. 63/460,872, entitled "Material Mixing and Granulation Systems and Methods," filed Apr. 20, 2023, the contents of which are hereby incorporated by reference in their entirety into the present disclosure.

TECHNICAL FIELD

The present application relates to material mixing, and specifically to batch granulation systems configured for medium to high shear mixing operations.

BACKGROUND

This section introduces aspects that may help facilitate a better understanding of the disclosure. Accordingly, these statements are to be read in this light and are not to be understood as admissions about what is or is not prior art.

A mixer-granulator is a machine that is commonly used in the manufacturing and processing of various materials, such as pharmaceuticals, chemicals, and food products. Its primary function is to agglomerate mixtures fine particles and binders into larger granules having uniform composition and a relatively narrow size distribution, which can then be used in a variety of applications. Controlling the breadth of the size distribution requires a balanced granule growth and breakage; growth is achieved by binding fine particles together with a liquid binder, up to a limit controlled by breakage. Mixer-granulators typically consist of an impeller having dispersive mixing elements such as blades or knives that rotate at high speeds within a stationary vessel. These systems use a combination of cutting and compression forces to effectively mix fine powder with binders and reduce the size of granules that have grown too large. More particularly, when a liquid binder material is fed into the mixer-granulator, it is subjected to the cutting and shearing action of the rotating blades as it is mixed with the fine powder. The shear field within the mixer-granulator affects the binder distribution, growth, and breakage of the granules; hence the uniformity of the product size and shape distributions.

Mixer-granulators can be used for wet granulation processes, where a liquid binder is added to the material to help bind the particles together. In this process, the material is mixed with the liquid binder and then fed into the shear granulator. The rotating blades of the machine help to break up the material and distribute the binder evenly throughout the mixture. The resulting granules are then dried and used in various applications. Roll-compaction granulators can also be used for dry granulation processes, where no liquid binder is used; instead the material is compressed into ribbons and then broken-up to form into granules. In this process, the material is fed into the machine and subjected to the compression forces between counter-rotating rollers, followed by cutting and by rotating blades within a stationary mesh cage. The resulting granules are then used in a variety of applications.

SUMMARY

Mixer-granulator systems are described herein. Particularly, a shear-gap granulator (SGG) is described, which is a type of mixer-granulator having two counter-rotating shafts, each with impeller assemblies, designed to create an extensional shear field in the gap between the impellers. In the granulation process, fine powders can be first added to the mixer and mechanically fluidized by the impellers, followed by the addition of a stream of liquid binder directly into this gap. The extensional shear field in the gap is effective in uniformly dispersing the binder, enabling control over the granule size distribution. Based on the intensity of shear in the gap, even high-viscosity binders can be dispersed effectively. Elsewhere in the mixer, the shear field and impact of the impeller tools is relatively moderate, avoiding over-consolidation, and enabling control over the breakage limit.

In one aspect, a mixing assembly can include a mixing basin, a first plurality of mixing paddles, a second plurality of mixing paddles, and at least one motor. The mixing basin can include first and second shafts extending therethrough, with the first and second shafts being arranged in parallel. The first plurality of mixing paddles can be positioned in an interior of the mixing basin, and each paddle of the first plurality of mixing paddles can be coupled with the first shaft and configured to rotate about a first axis. The first plurality of mixing paddles can form a first rotational circumference defined as the rotational path of an outermost tip of the first plurality of mixing paddles. The second plurality of mixing paddles can be positioned in the interior of the mixing basin, and each paddle of the second plurality of mixing paddles can be coupled with the second shaft and configured to rotate about a second axis. The second plurality of mixing paddles can form a second rotational circumference defined as the rotational path of an outermost tip of the second plurality of mixing paddles. The at least one motor can be coupled with the first and second shaft and operable to rotate the first and second shafts in opposite axial directions to thereby rotate the first and second pluralities of mixing paddles. The first rotational circumference can be spaced apart from the second rotational circumference to define a shear gap therebetween.

In another aspect, a mixing assembly can include an outer frame defining a first outer frame end and a second outer frame end, and an inner frame coupled with the outer frame via a first rotatable coupling at the first outer frame end and a second rotatable coupling at the second outer frame end. The inner frame can define a first inner frame end adjacent the first outer frame end and a second inner frame end adjacent the second outer frame end. The second frame can be configured to rotate 360-degrees relative to the first frame via the first and second rotatable couplings. The second frame can include at least one motor coupled with the second frame and operable to rotate a pair of shafts, a mixing basin including a movable door, wherein the movable door is configured to permit access to an interior of the mixing basin, and a plurality of paddles positioned in the interior of the mixing basin. Each shaft of the pair of shafts can extend in parallel through the interior of the mixing basin. The plurality of paddles can be positioned in the interior of the mixing basin, and each paddle of the plurality of paddles can be coupled with at least one shaft. An activation of the at least one motor can be configured to rotate the plurality of paddles in opposite direction for mixing a material within the mixing basin.

In another aspect, a granulator can include a mixing basin having first and second shafts extending therethrough, a first plurality of mixing paddles, a second plurality of mixing paddles, and a liquid delivery tube. The mixing basin can include a first module, a second module, and a third module. The first module can be configured to receive materials into the first module, granulate the materials to form granulated materials, and convey the granulated materials away from the first module. The second module can be configured to convey the materials to the first module. The third module can be configured to receive the granulated materials and discharge the granulated materials from the mixing basin. The first plurality of mixing paddles can be positioned in at least the second module of the mixing basin, and each paddle of the first plurality of mixing paddles can be coupled with the first shaft and configured to rotate about a first axis. The first plurality of mixing paddles can form a first rotational circumference defined as the rotational path of an outermost tip of the first plurality of mixing paddles. The second plurality of mixing paddles can be positioned in at least the second module of the mixing basin, and each paddle of the second plurality of mixing paddles can be coupled with the second shaft and configured to rotate about a second axis. The second plurality of mixing paddles can form a second rotational circumference defined as the rotational path of an outermost tip of the second plurality of mixing paddles. The first rotational circumference can be spaced apart from the second rotational circumference to define a shear flow gap therebetween. The liquid delivery tube can be fluidly coupled with the mixing basin and configured to selectively transfer a liquid to a position within the shear gap while the first plurality of mixing paddles and the second plurality of mixing paddles rotate.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

Figures 30, 31:
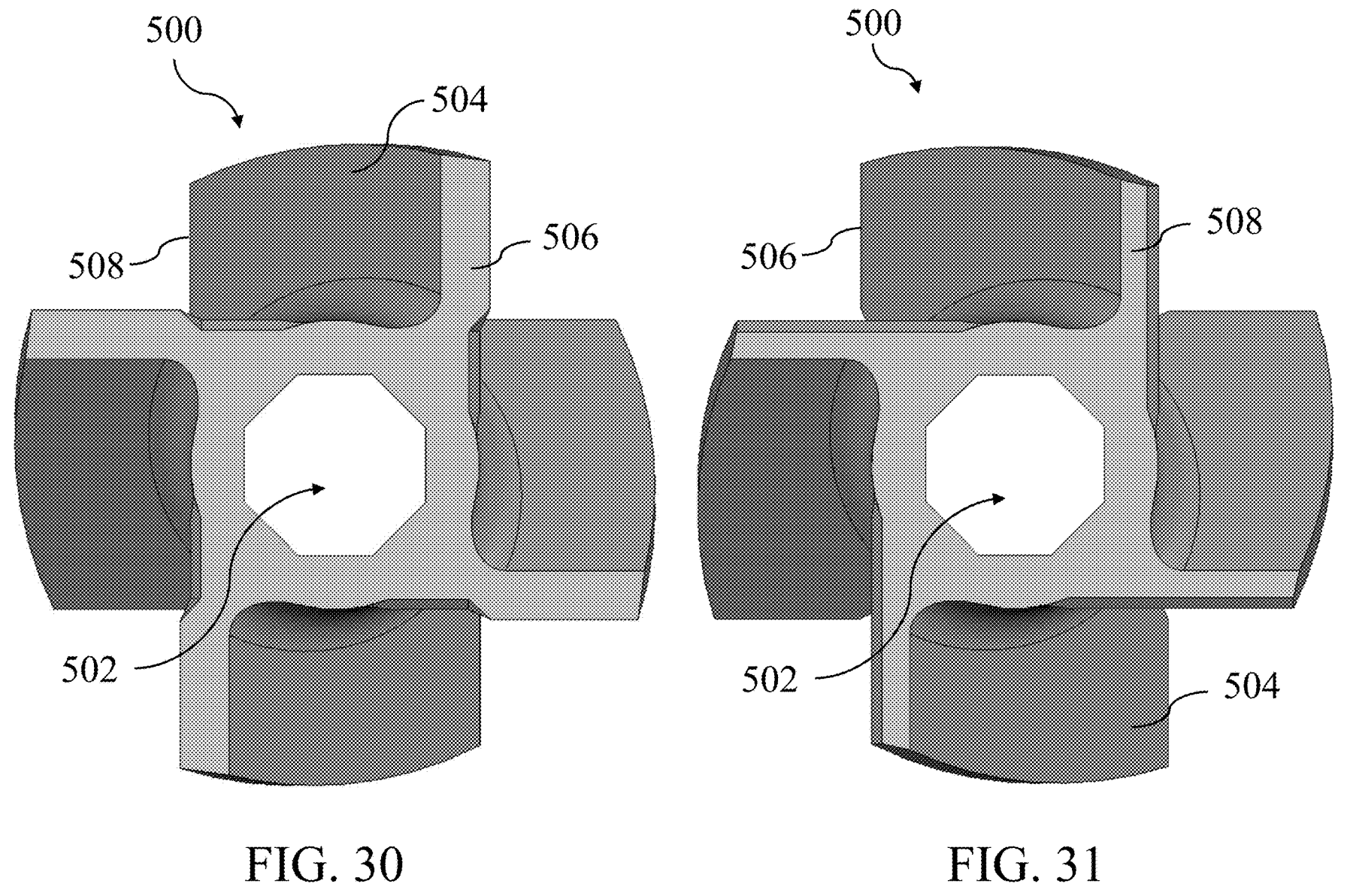

FIG. 30 depicts a front elevational view of the fourth exemplary modular mixing paddle of FIG. 28;

FIG. 31 depicts a rear elevational view of the fourth exemplary modular mixing paddle of FIG. 28;

Figure 1:
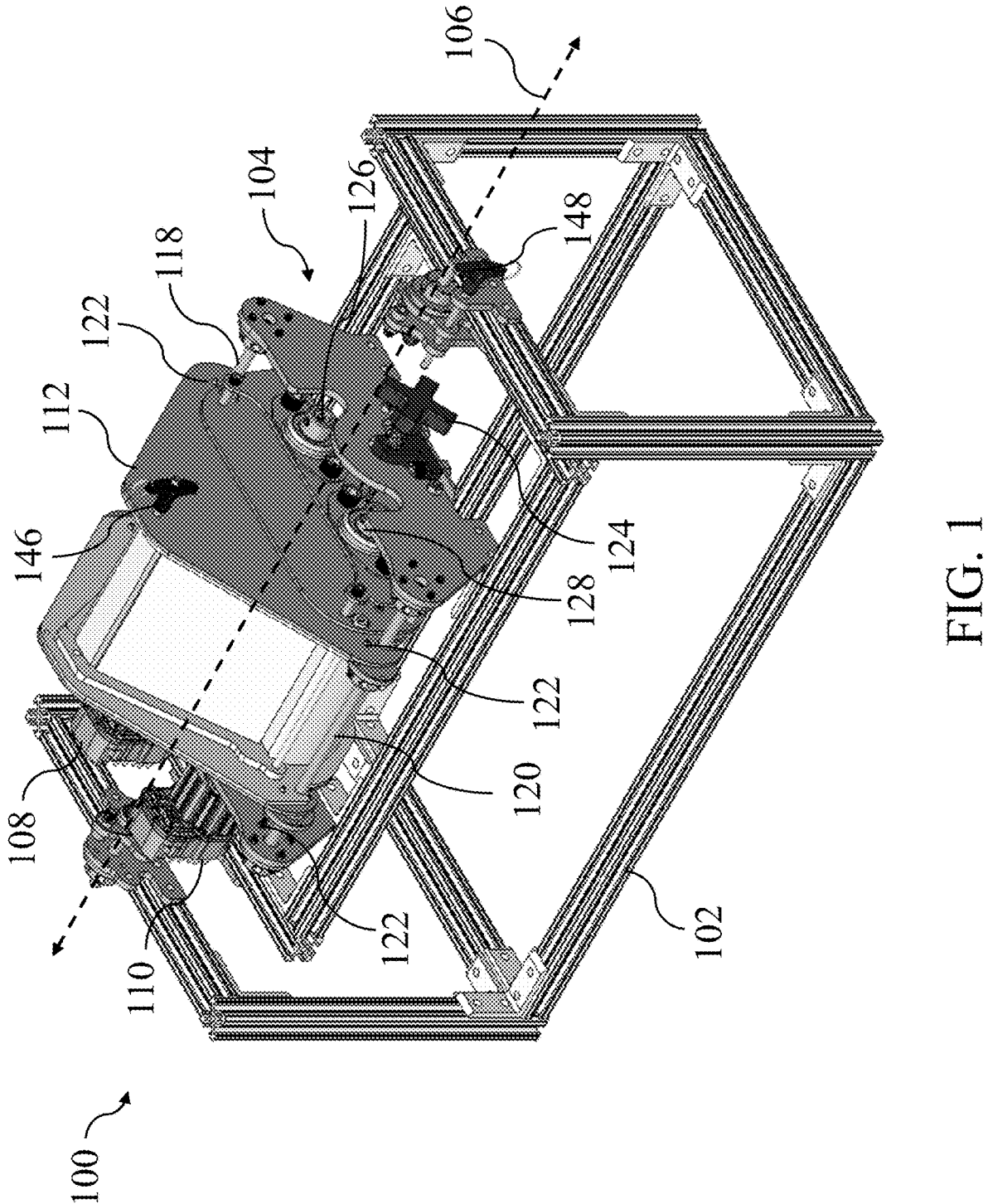
FIG. 1 depicts a front perspective view of one exemplary shear-gap granulator assembly designed for batch processing.
Figure 2:
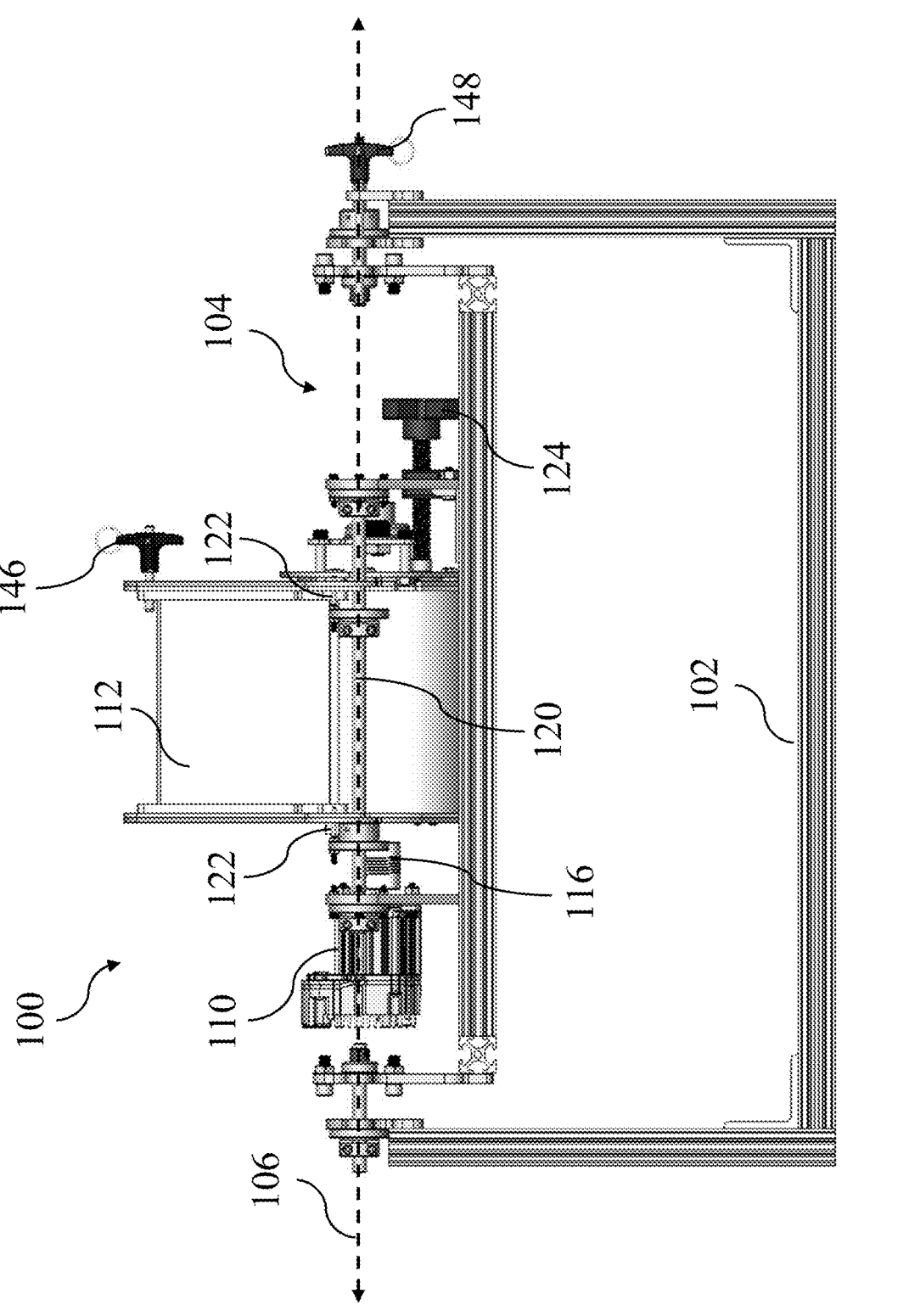
FIG. 2 depicts a front isometric view of the shear-gap granulator assembly of FIG. 1.
Figure 3:
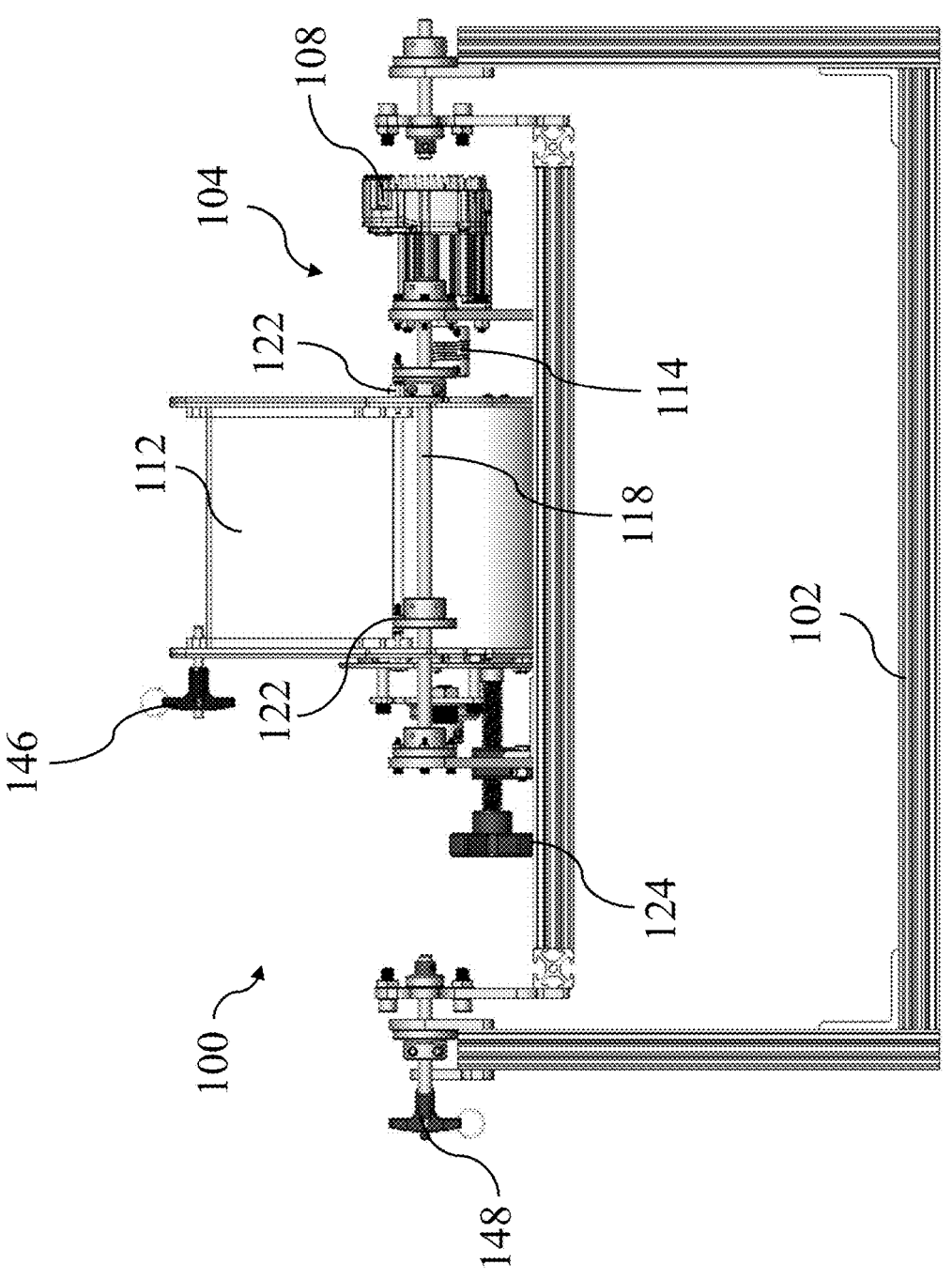
FIG. 3 depicts a rear elevational view of the shear-gap granulator assembly of FIG. 1.
Figure 4:
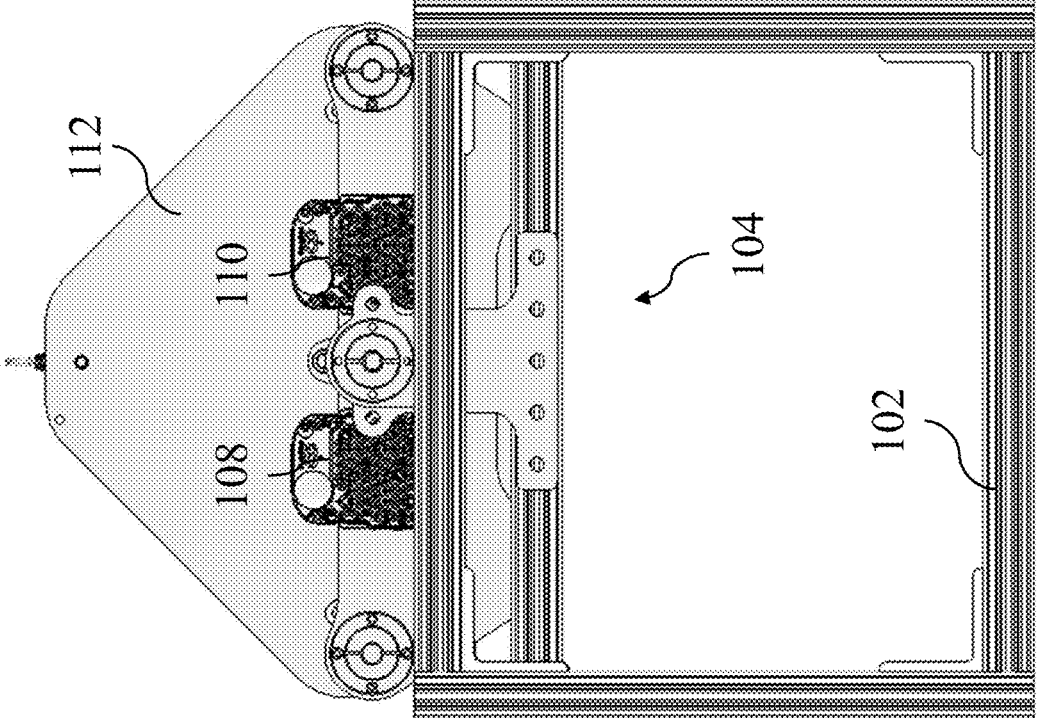
FIG. 4 depicts a left-side elevational view of the shear-gap granulator assembly of FIG. 1.
Figure 4:
Figure 5:
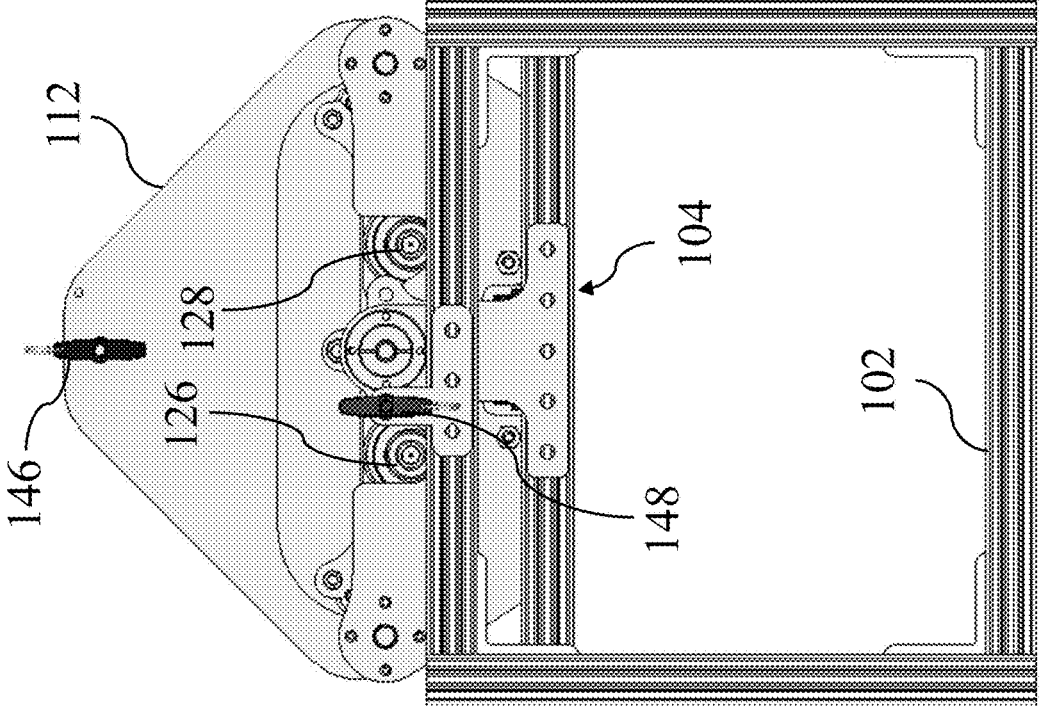
FIG. 5 depicts a right-side elevational view of the shear-gap granulator assembly of FIG. 1.
Figure 6:
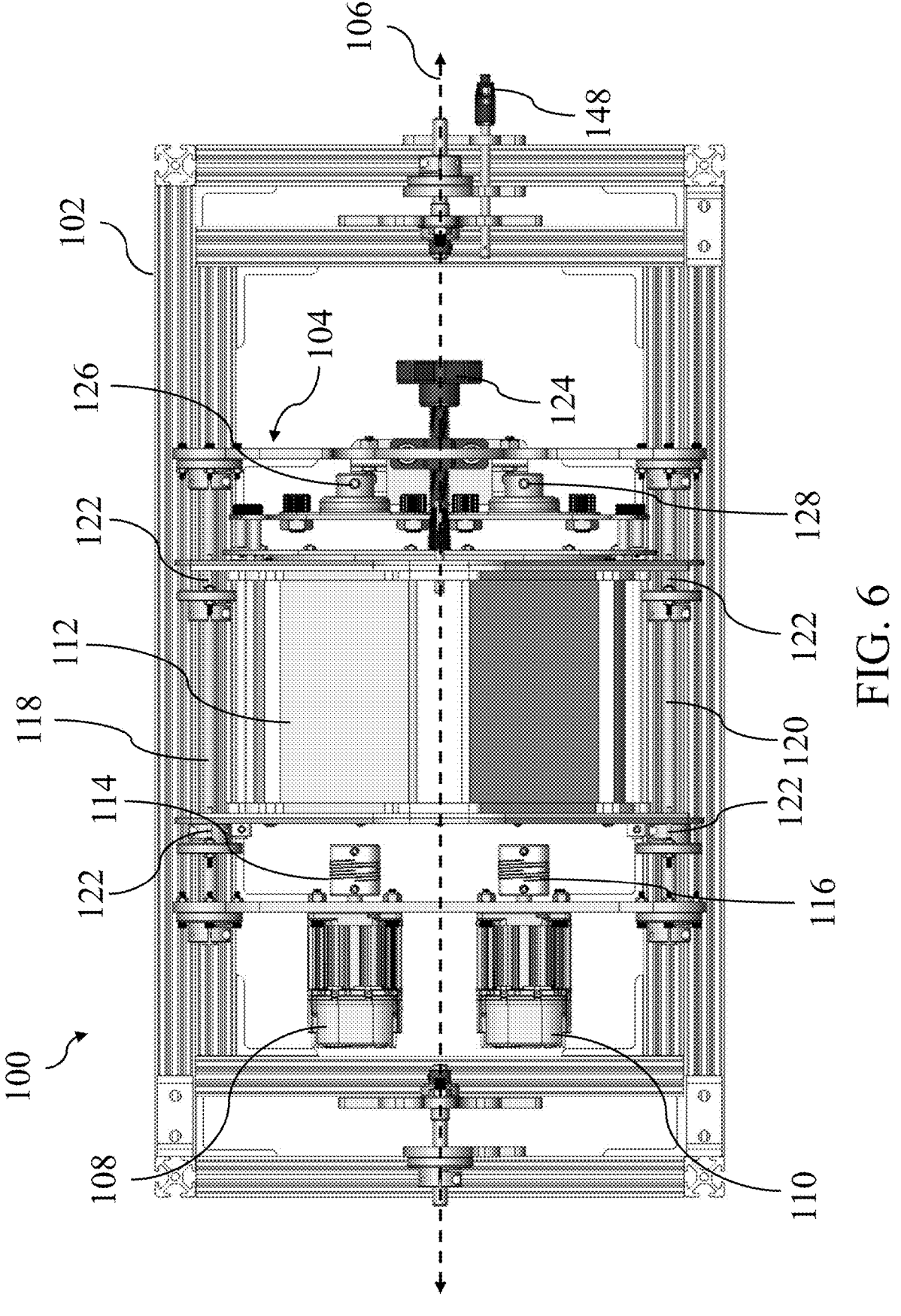
FIG. 6 depicts a top plan view of the shear-gap granulator assembly of FIG. 1.
Figure 7:
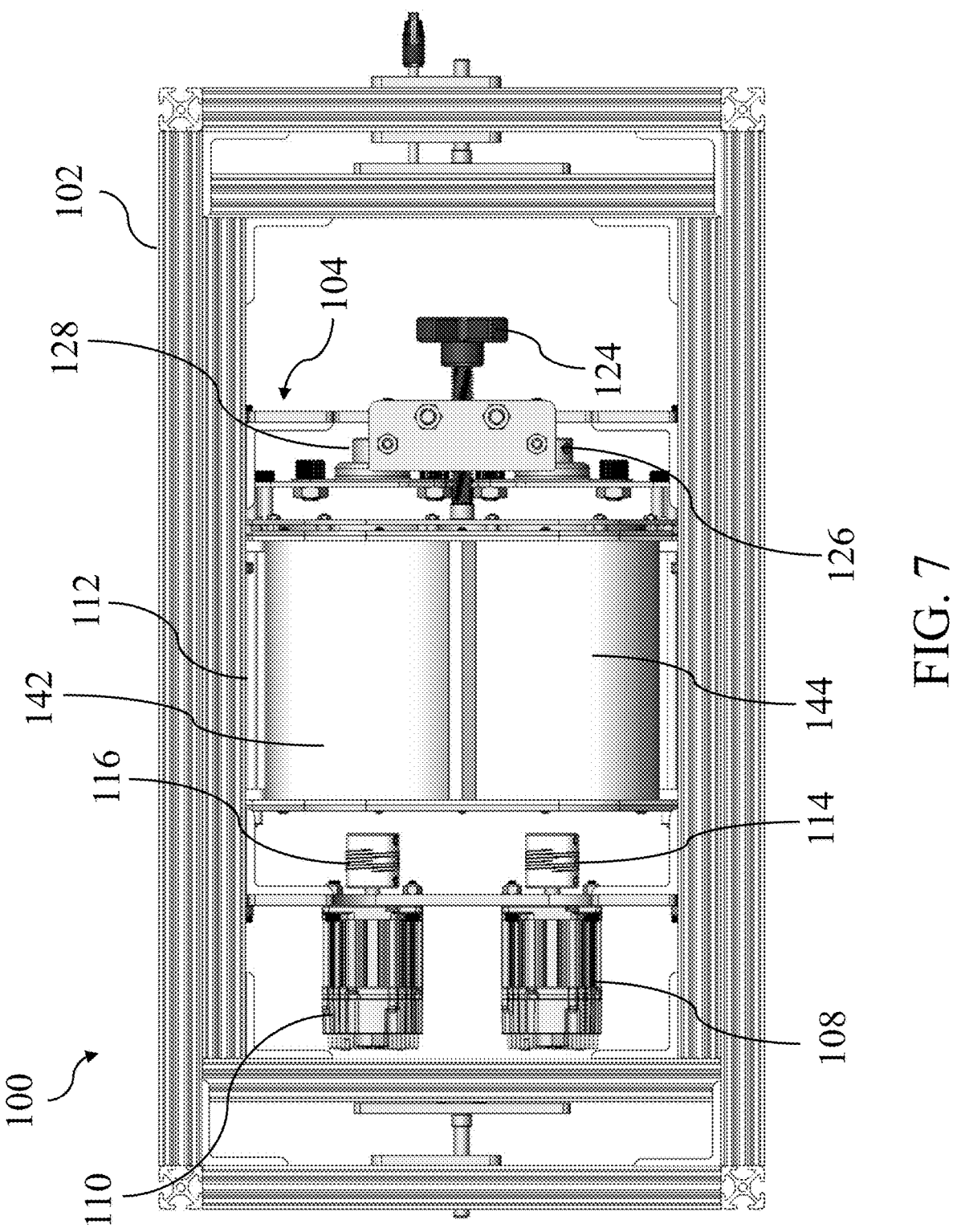
FIG. 7 depicts a bottom plan view of the shear-gap granulator assembly of FIG. 1.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown, or the precise experimental arrangements used to arrive at the various graphical results shown in the drawings.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

The shear-gap granulator (SGG) provides a mixer-granulator system wherein fine powders are granulated using a binder liquid to form granules. The SGG system described is easily dissembled for cleaning and has interchangeable mixing elements for use in modifying the flow fields within the device. The SGG system design is scalable over a range of batch sizes and is extensible to continuous processing. Particularly, the SGG includes modified impellers designed to optimize the shear field in the converging flow zone, suitable to disperse the liquid binder uniformly within the powder flow. The shear-gap granulator (SGG) also includes a binder delivery system for selectively introducing the granulation binder into the shear gap as described above. The shear field is sufficient to disperse highly viscous liquid binders, suspensions, or even pastes. In some applications, the binder viscosity can be greater than 50 centipoise (cP), or alternatively greater than 100 cP. In certain applications, the binder viscosity can be greater than 500 cP, or alternatively greater than 5,000 cP. The upper limit to the viscosity is typically limited by the binder delivery system rather than dispersion within the shear gap. With a high-pressure binder delivery pump, viscous binders in excess of 1,000,000 cP are possible.

Compared to legacy paddle mixers, several other modifications are described to optimize the design of the mixer as a granulator, including for small-batch prototype formulations.

As shown in FIGS. 1-7, one exemplary SGG system (100) designed for batch processing includes various components such as an outer frame (102) supporting an inner rotating assembly (104) that is configured to rotate about an axis (106) relative to the outer frame (102), and one or more motors (108, 110) each operatively coupled with an impeller, consisting of a plurality of mixer paddles (200, 300, 400, 500, 600) (see, FIGS. 15-18, FIGS. 20-27, FIGS. 28-31, and FIGS. 32-35, respectively), within a basin (112). The basin (112) is supported by the inner rotating assembly (104). Particularly, the motors (108, 110) are configured to operatively couple with the mixer paddles (200, 300, 400, 500, 600) (see, FIGS. 15-18, FIGS. 20-27, FIGS. 28-31, and FIGS. 32-35, respectively) within the basin (112) (see, FIG. 19) via respective shaft couplers (114, 116).

The basin (112), adapted to contain materials therein for mixing and/or granulating, is configured to couple with the inner rotating assembly (104) by resting on basin seating rods (118, 120) and locking into place using one or more basin fasteners (122). The basin (112) can be affixed into place relative to a direction parallel to the axis (106) using a clamp (124). The bearings (126, 128) positioned on the inner rotating assembly opposite the motors (108, 110) are configured to accept the paddle shafts (130, 132) (see, FIG. 19), which are rods positioned to span from the shaft couplers (114, 116) to the bearings (126, 128). The paddle shafts (130, 132) (see, FIG. 19) therefore span through the inner cavity of the basin (112) such that the mixer paddles (200, 300, 400, 500, 600) (see, FIGS. 15-18, FIGS. 20-27, FIGS. 28-31, and FIGS. 32-35, respectively) are inserted thereon. As the motors (108, 110) drive rotation of the shaft couplers (114, 116), the mixer paddles (200, 300, 400, 500, 600) rotate to mix the materials within the basin (112).

Figure 8:
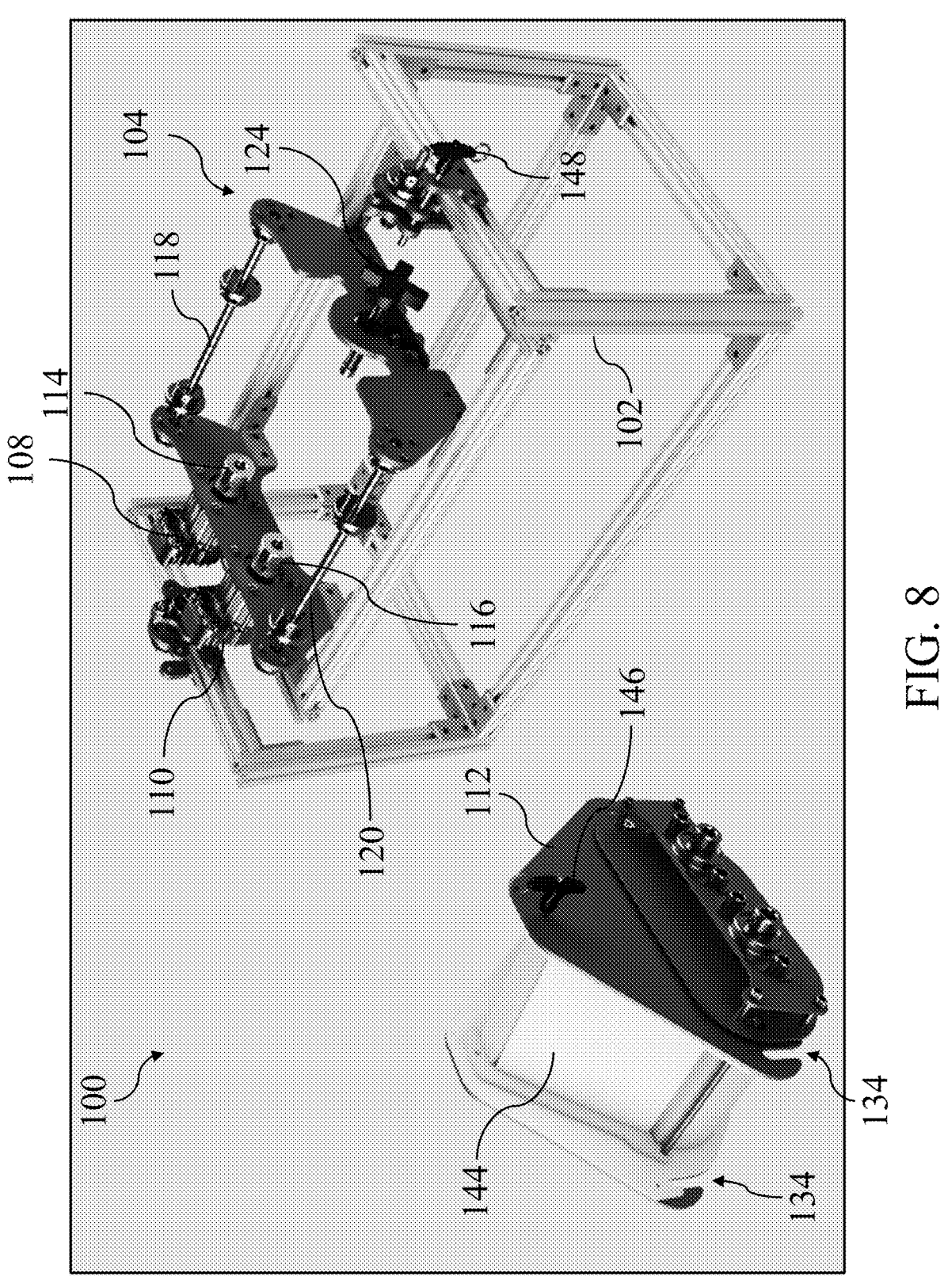
FIG. 8 depicts a front perspective view of the shear-gap granulator assembly of FIG. 1, showing the basin removed from the inner rotating assembly.

As described above, and shown by FIG. 8, the basin (112) is configured to rest on the basin seating rods (118, 120) and lock into place using one or more basin fasteners (122). Particularly, the basin (112) includes side slots (134) on each corner for hooking onto the basin seating rods (118, 120), and such that the basin (112) can be easily removed, such as for easier cleaning or transport.

Figure 9:
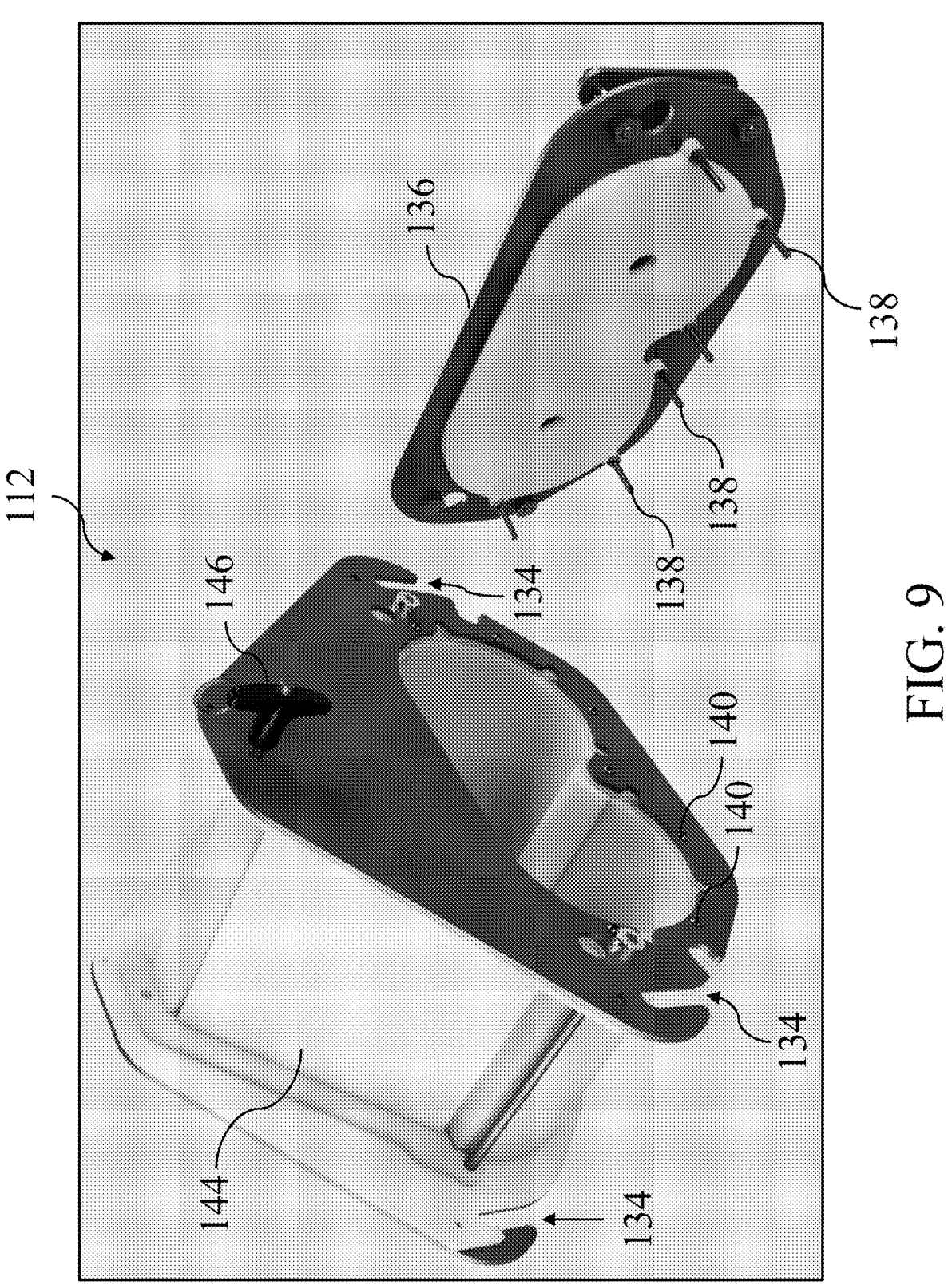
FIG. 9 depicts the basin of the shear-gap granulator assembly of FIG. 1, showing a side of the basin removed.

With reference to FIG. 9, the basin (112) is configured to house one or more mixer paddles (200, 300, 400, 500, 600) (see, FIGS. 15-18, FIGS. 20-27, FIGS. 28-31, and FIGS. 32-35, respectively) within that are operable to mix and granulate materials held within the basin (112). To allow for easier access to the paddle mixers therein, such as for removal of the paddle mixers or for assembly of the paddle mixers, the basin (112) includes a detachable side panel (136). The detachable side panel (136) includes a plurality of pins (138) configured to insert into respective openings (140) on the side of the basin (112) to ensure the side panel (136) remains affixed in a static position during operation.

Figures 10A, 10B:
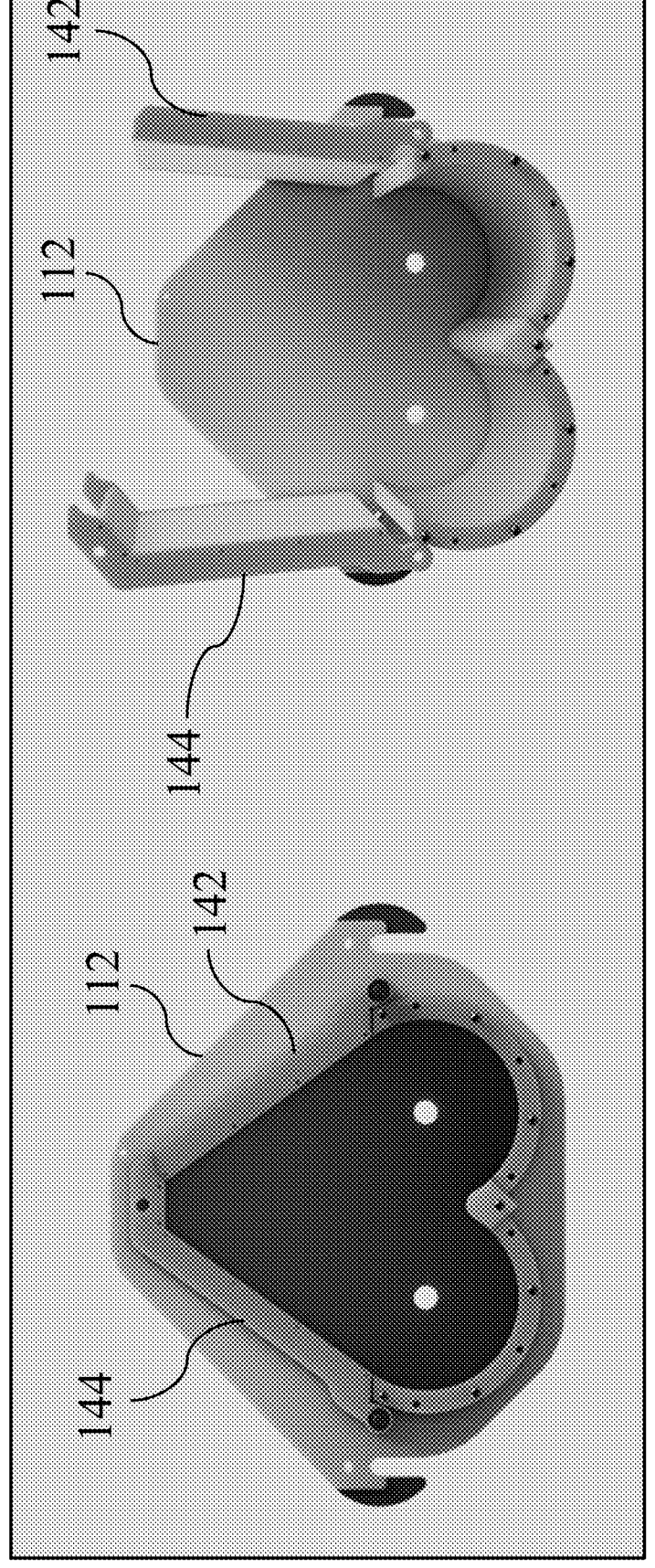
FIG. 10A depicts the basin of the shear-gap granulator assembly of FIG. 1, showing a side of the basin removed and the doors closed.
FIG. 10B depicts the basin of the shear-gap granulator assembly of FIG. 1, showing a side of the basin removed and the doors opened.

With reference to FIGS. 10A-10B, the basin (112) further includes a pair of movable doors (142, 144) which may be hinged open by operating or removing a fastener, such as a pin (146) or other locking mechanism. FIG. 10A shows the fastener (146) in place and preventing the doors (142, 144) from opening (such as during operation), while FIG. 10B shows the fastener (146) removed to open the doors (142, 144) (such as to remove the materials from within). When the basin (112) is attached to the inner rotating assembly (104), the basin (112) (by way of its attachment to the inner rotating assembly (104)) is configured to flip 180-degrees upside down to discharge the mixed or granulated material contents into a bin (not shown) placed underneath once the doors (142, 144) are opened.

Figure 11:
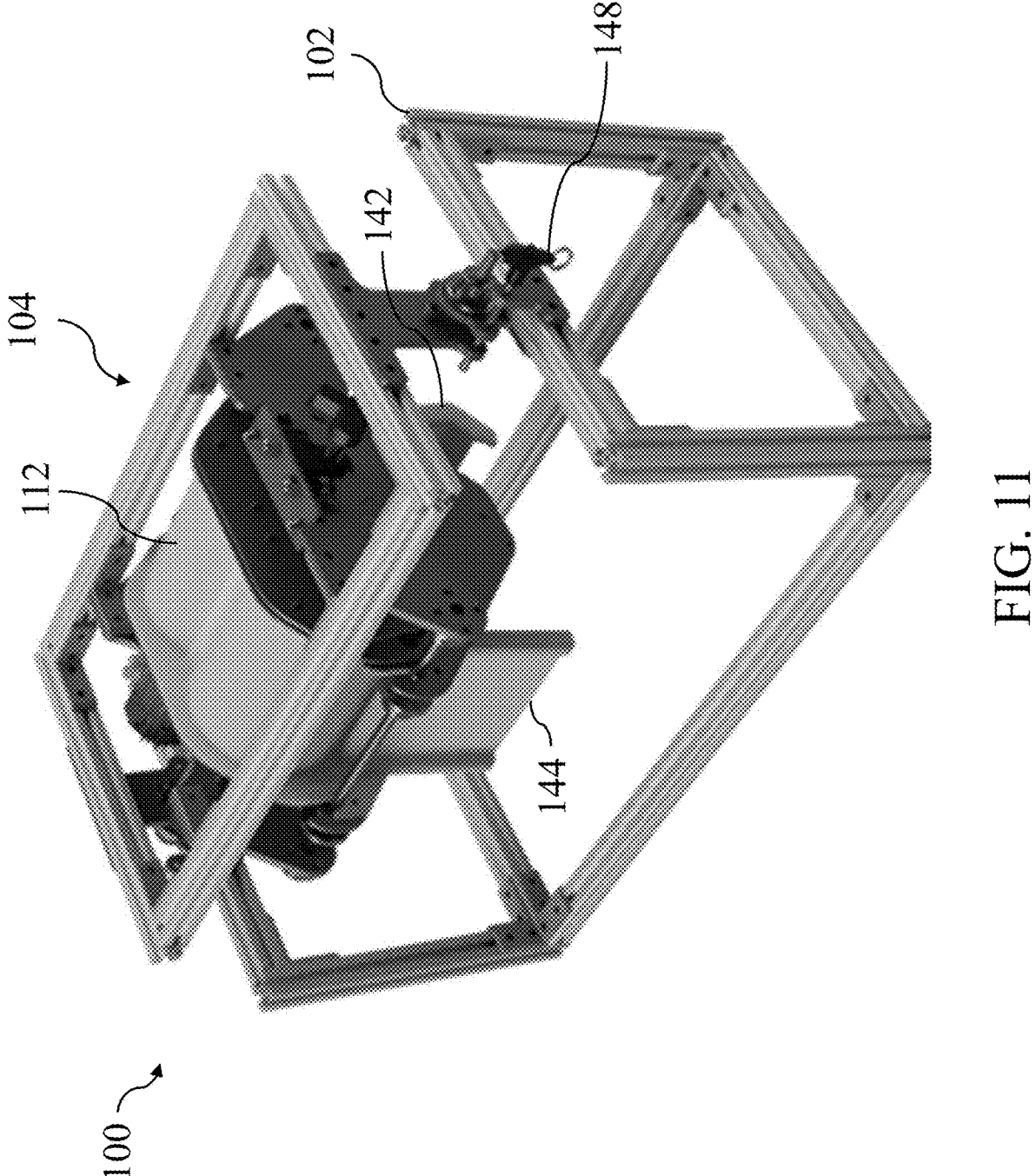
FIG. 11 depicts an upper perspective view of the shear-gap granulator assembly of FIG. 1, showing the inner rotating assembly rotated 180-degrees with the basin doors opened to allow for discharge of a granulation batch.
Figure 12:
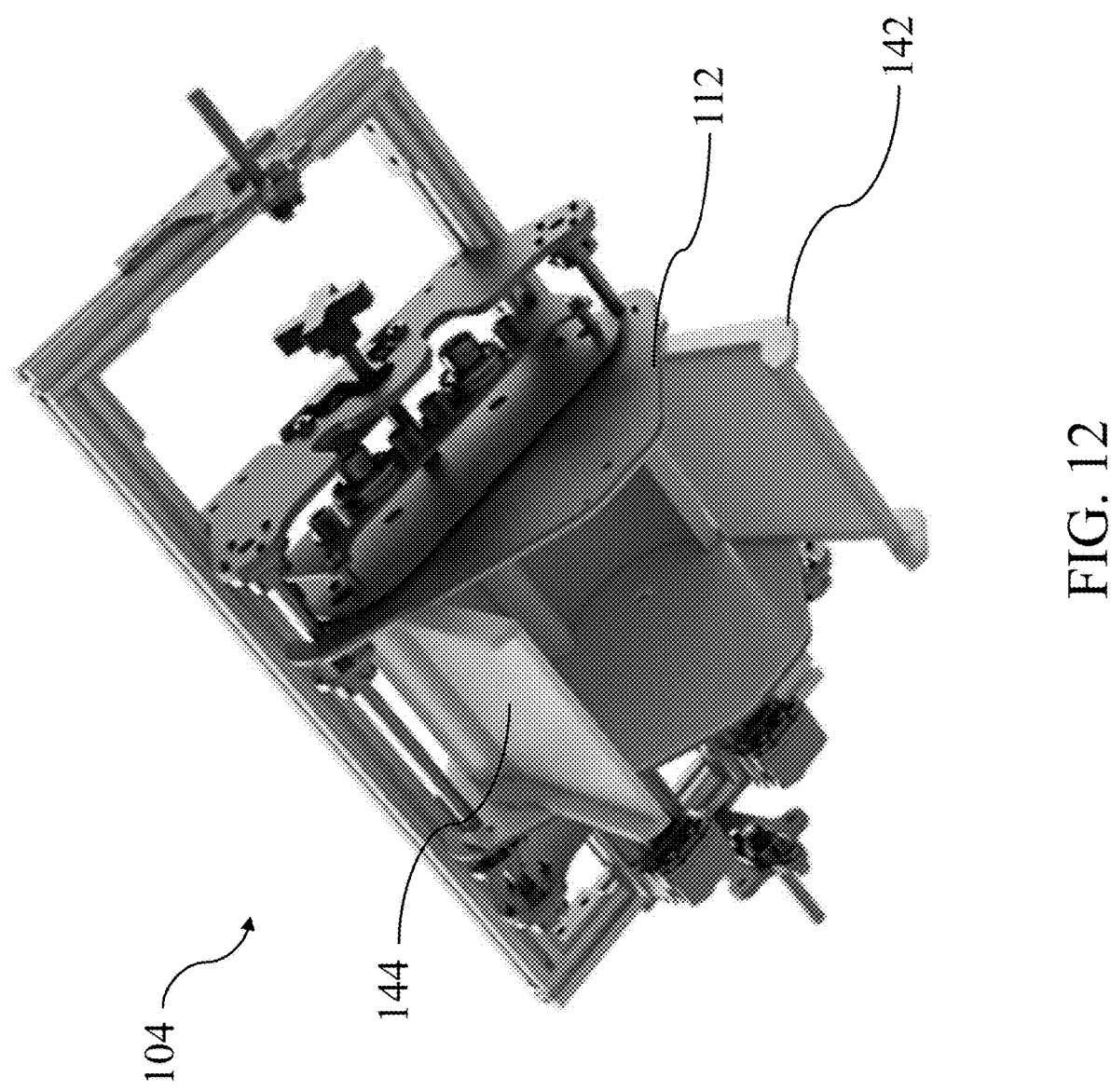
FIG. 12 depicts a lower perspective view of the shear-gap granulator assembly of FIG. 1, showing the outer frame removed for clarity and showing the inner rotating assembly rotated 180-degrees with the basin doors opened.
Figures 13, 14:
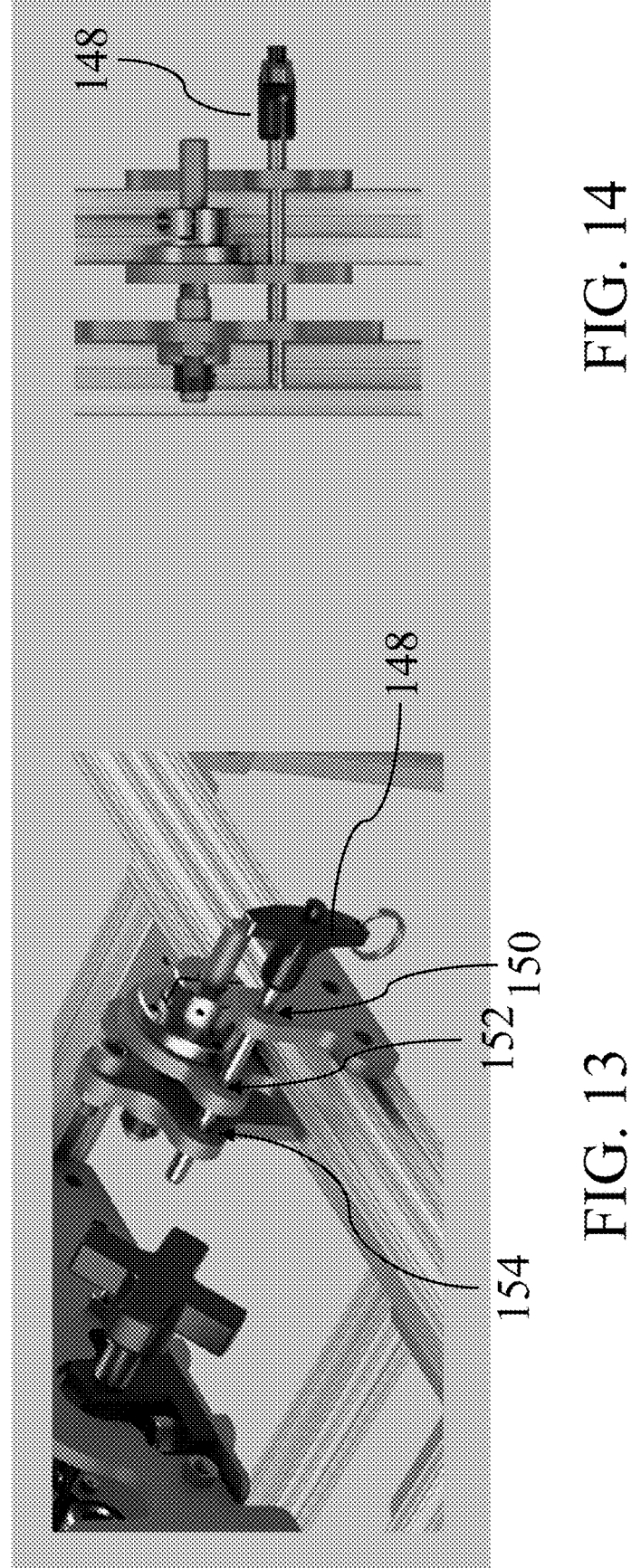
FIG. 13 depicts a perspective view of the locking and release mechanism for selectively permitting and restricting movement of the inner rotating assembly relative to the outer frame.
FIG. 14 depicts a top plan view of the locking and release mechanism of FIG. 13.
Figures 15, 16:
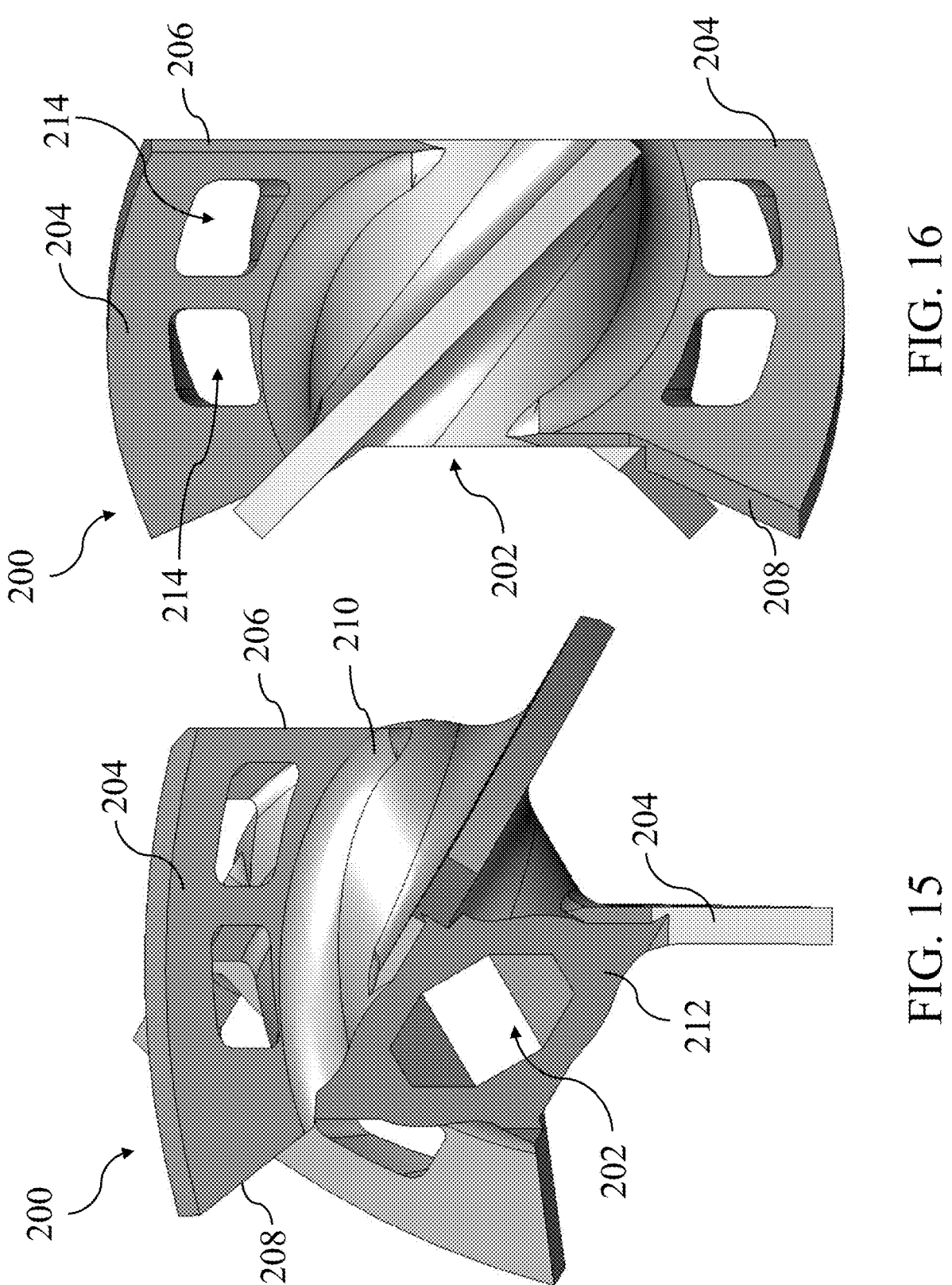
FIG. 15 depicts a front perspective view of a first exemplary modular mixing paddle configured for use with the shear-gap granulator assembly of FIG. 1.
FIG. 16 depicts a side elevational view of the first exemplary modular mixing paddle of FIG. 15.
Figures 17, 18:
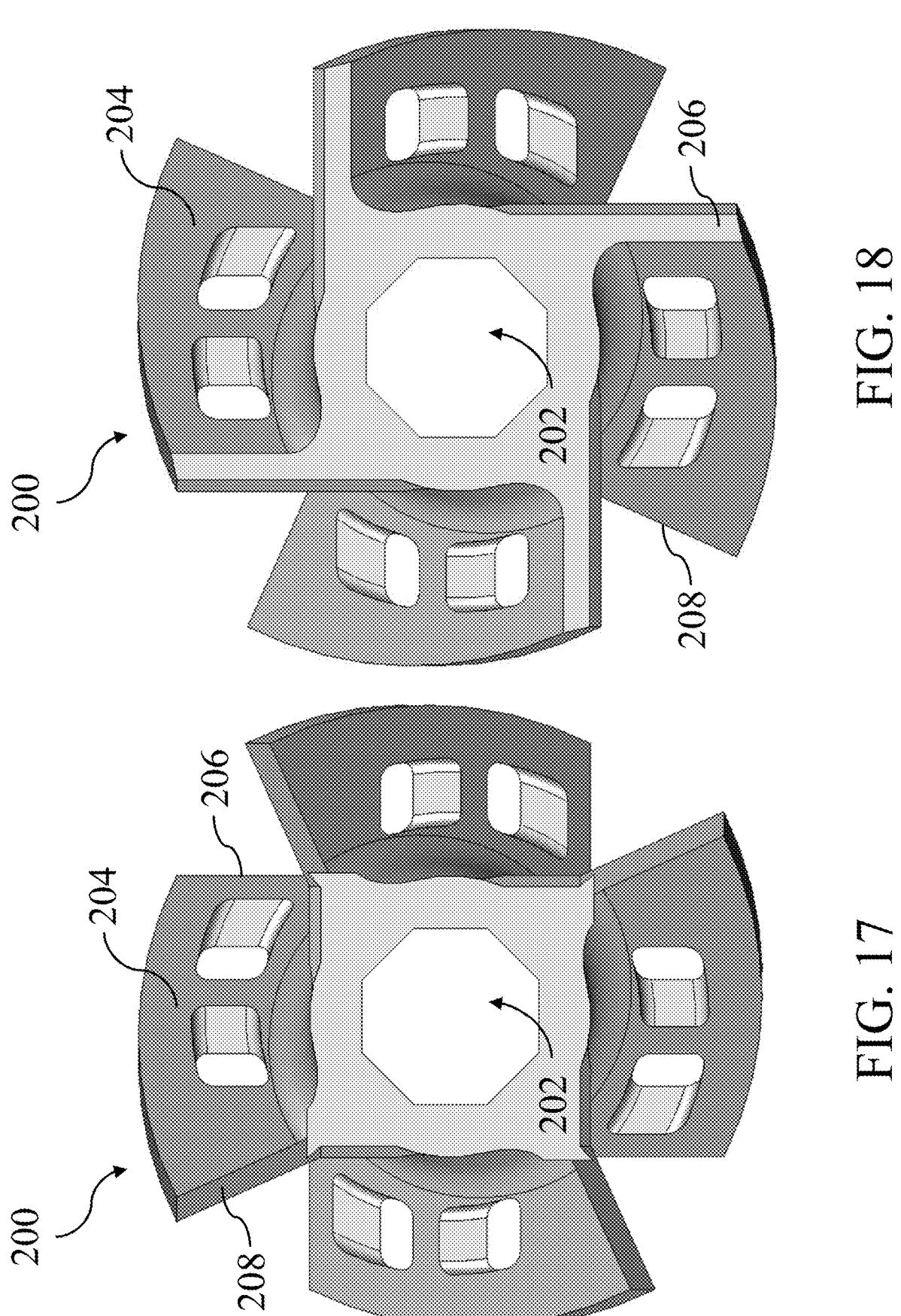
FIG. 17 depicts a front elevational view of the first exemplary modular mixing paddle of FIG. 15.
FIG. 18 depicts a rear elevational view of the first exemplary modular mixing paddle of FIG. 15.

Shown in FIGS. 11-12 is the inner rotating assembly (104) having been flipped 180-degrees relative to the outer frame (102), with the doors (142, 144) opened, to drop the contents of the basin (112). Accordingly, the inner rotating assembly (104) and outer frame (102) are coupled via a rotatable coupling (148). As shown in FIGS. 13-14, the rotatable coupling (148) includes a locking mechanism to selectively permit or restrict the rotation of the inner rotating assembly (104) relative to the outer frame (102). In one example, the rotatable coupling (148) can include a pin configured to be positioned through aligned slots (150, 152, 154) on the inner rotating assembly (104) and outer frame (102), respectively. When the pin is positioned through the slots (150, 152, 154), rotation is restricted. When the pin is removed from the slots (150, 152, 154), rotation is permitted such that a user or motorized device may push the inner rotating assembly (104) to rotate it upside down (and subsequently back to right side up) relative to the outer frame (102).

Figure 19:
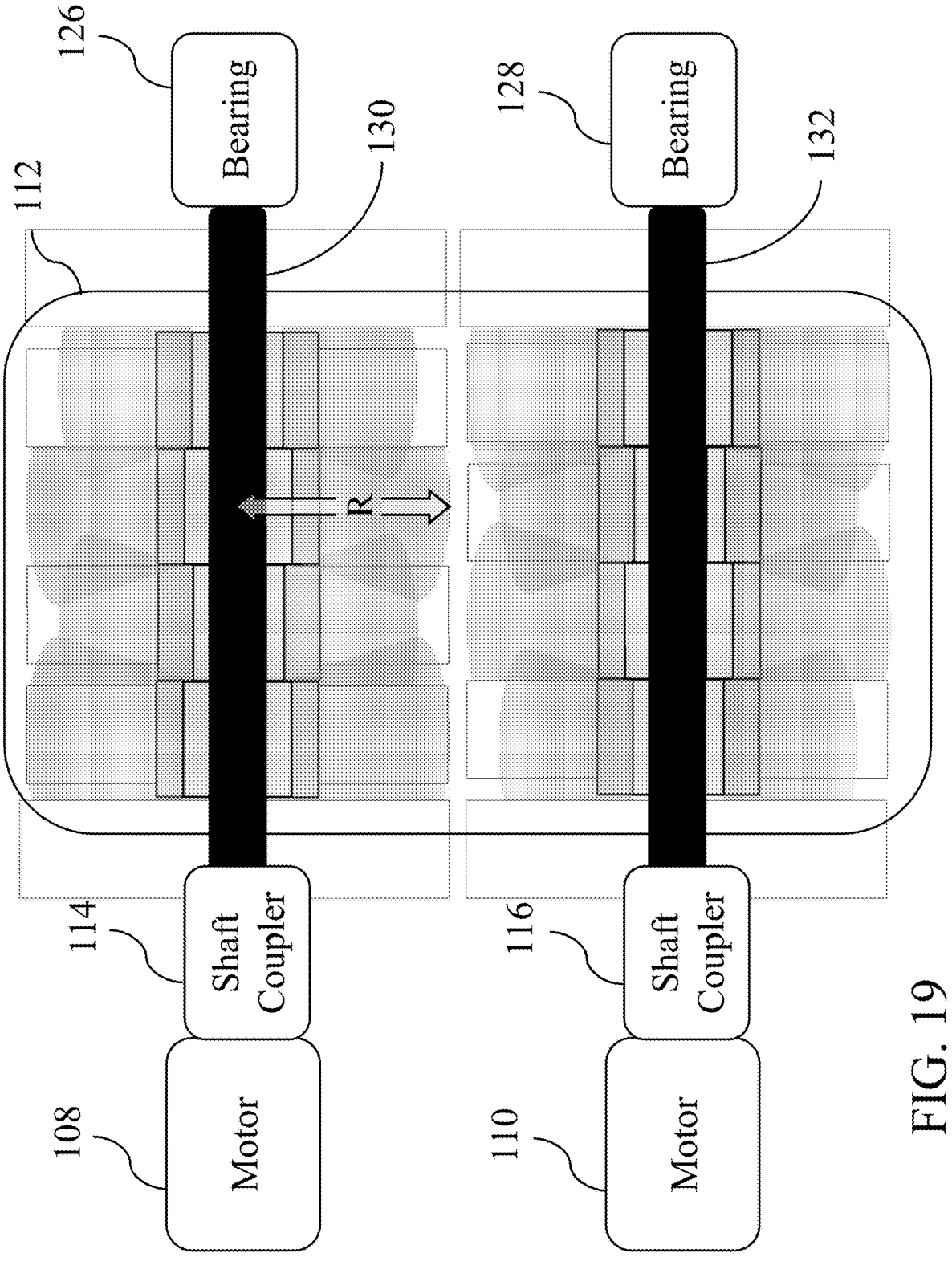
FIG. 19 depicts one example application of eight modular mixing paddles installed on the pair of paddle shafts within the basin.
Figures 20, 21:
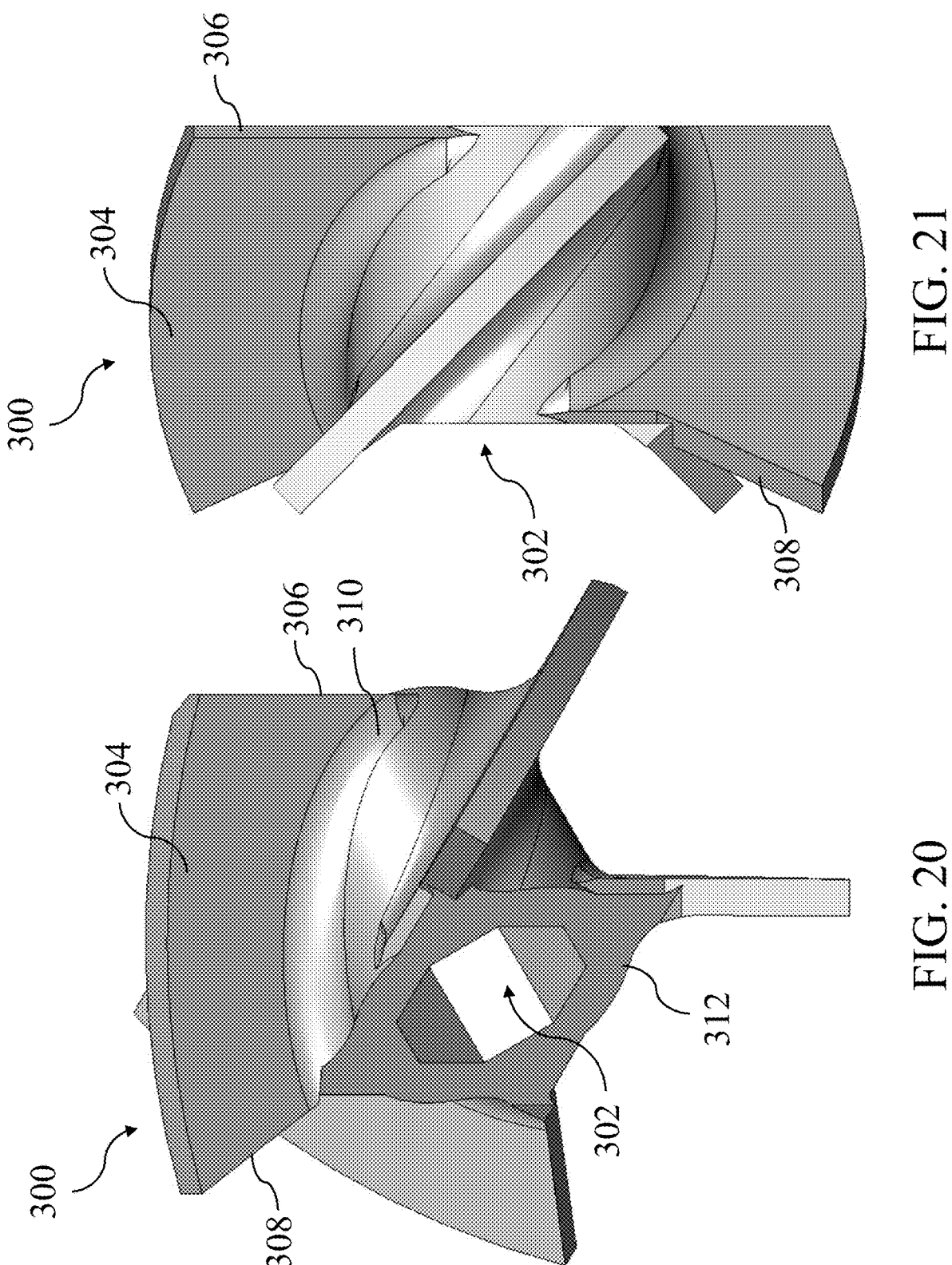
FIG. 20 depicts a front perspective view of a second exemplary modular mixing paddle configured for use with the shear-gap granulator assembly of FIG. 1.
FIG. 21 depicts a side elevational view of the second exemplary modular mixing paddle of FIG. 20.
Figures 22, 23:
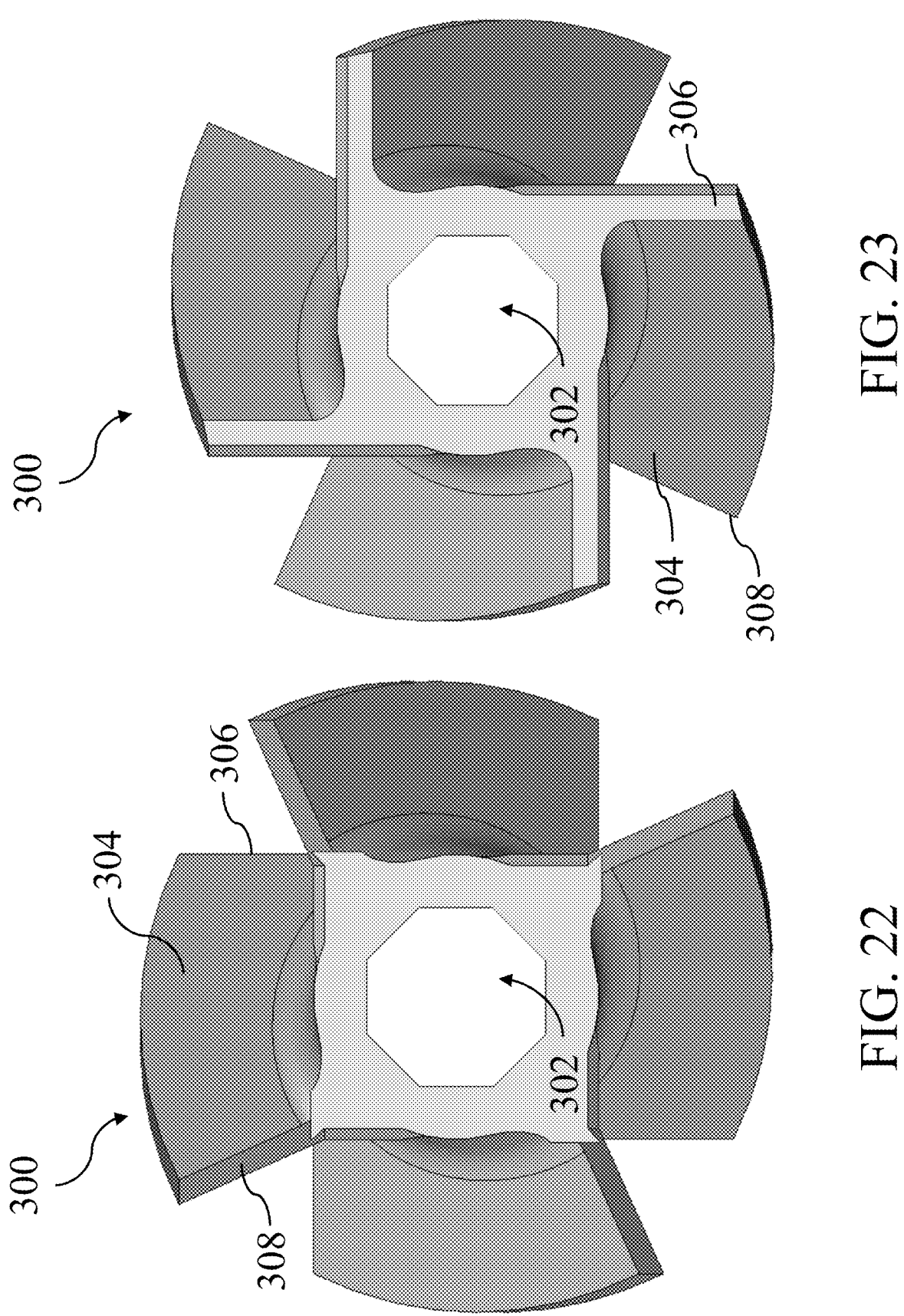
FIG. 22 depicts a front elevational view of the second exemplary modular mixing paddle of FIG. 20.
FIG. 23 depicts a rear elevational view of the second exemplary modular mixing paddle of FIG. 20.
Figures 24, 25:
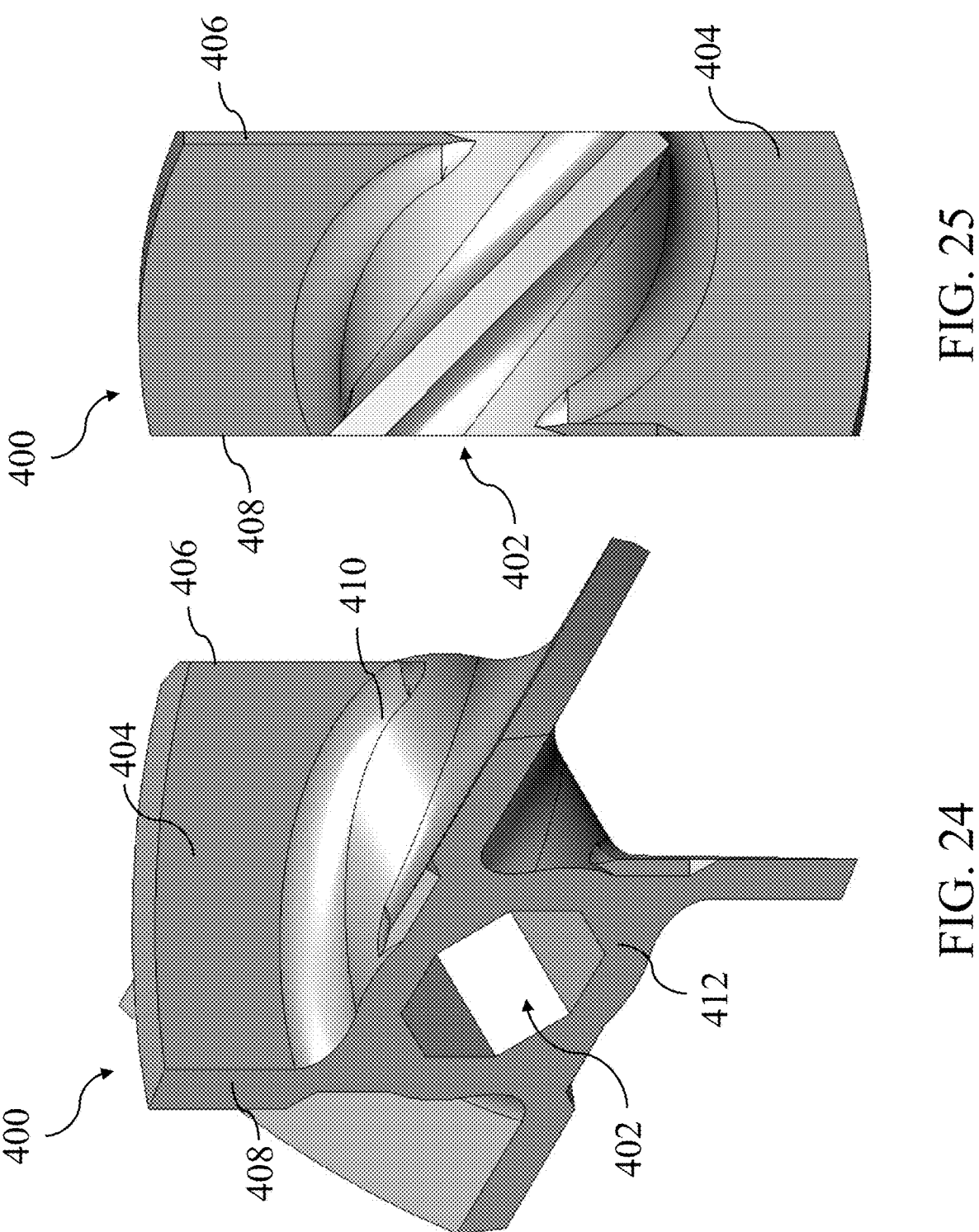
FIG. 24 depicts a front perspective view of a third exemplary modular mixing paddle configured for use with the shear-gap granulator assembly of FIG. 1.
FIG. 25 depicts a side elevational view of the third exemplary modular mixing paddle of FIG. 24.
Figures 26, 27:
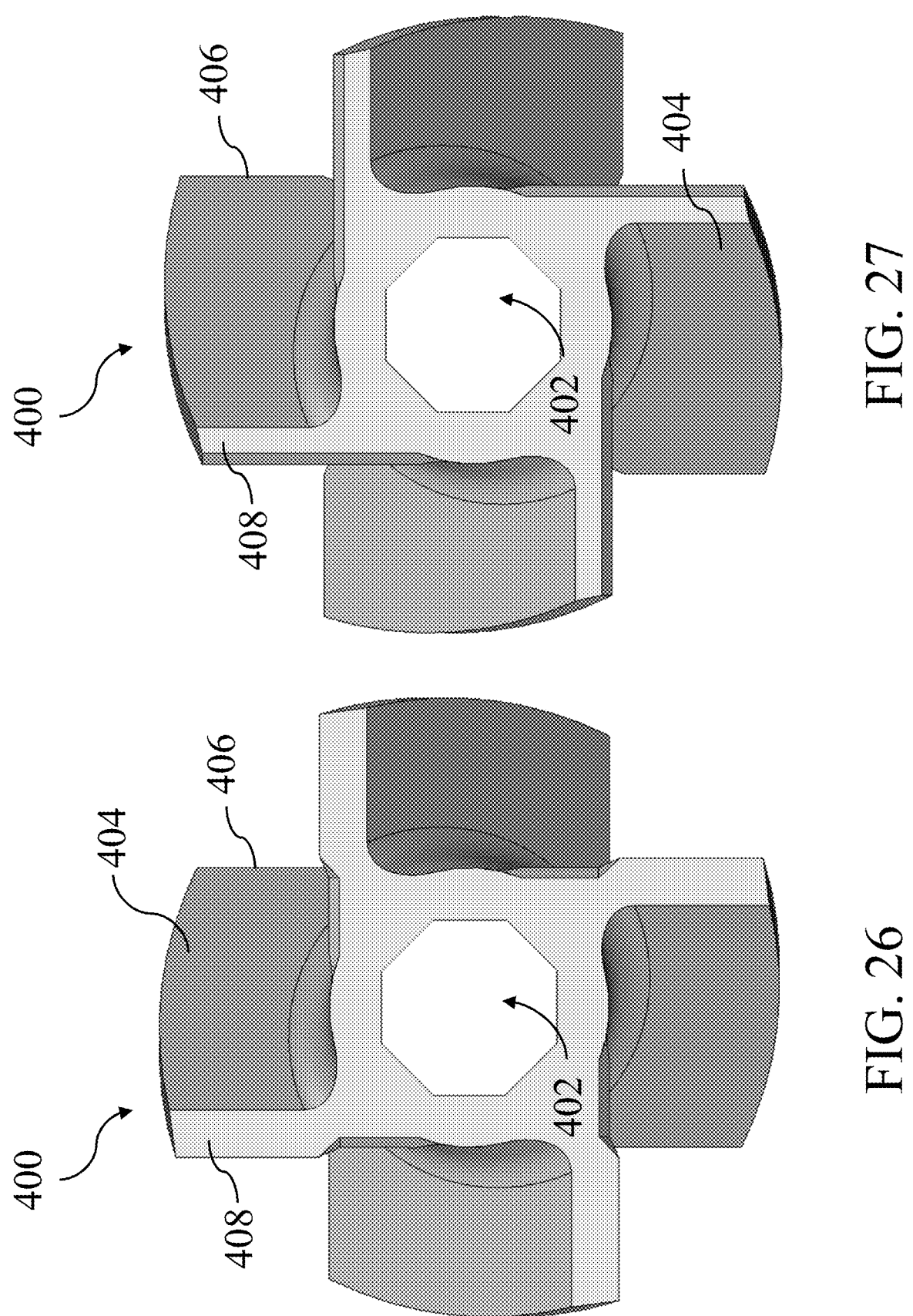
FIG. 26 depicts a front elevational view of the third exemplary modular mixing paddle of FIG. 24.
FIG. 27 depicts a rear elevational view of the third exemplary modular mixing paddle of FIG. 24.
Figures 28, 29:
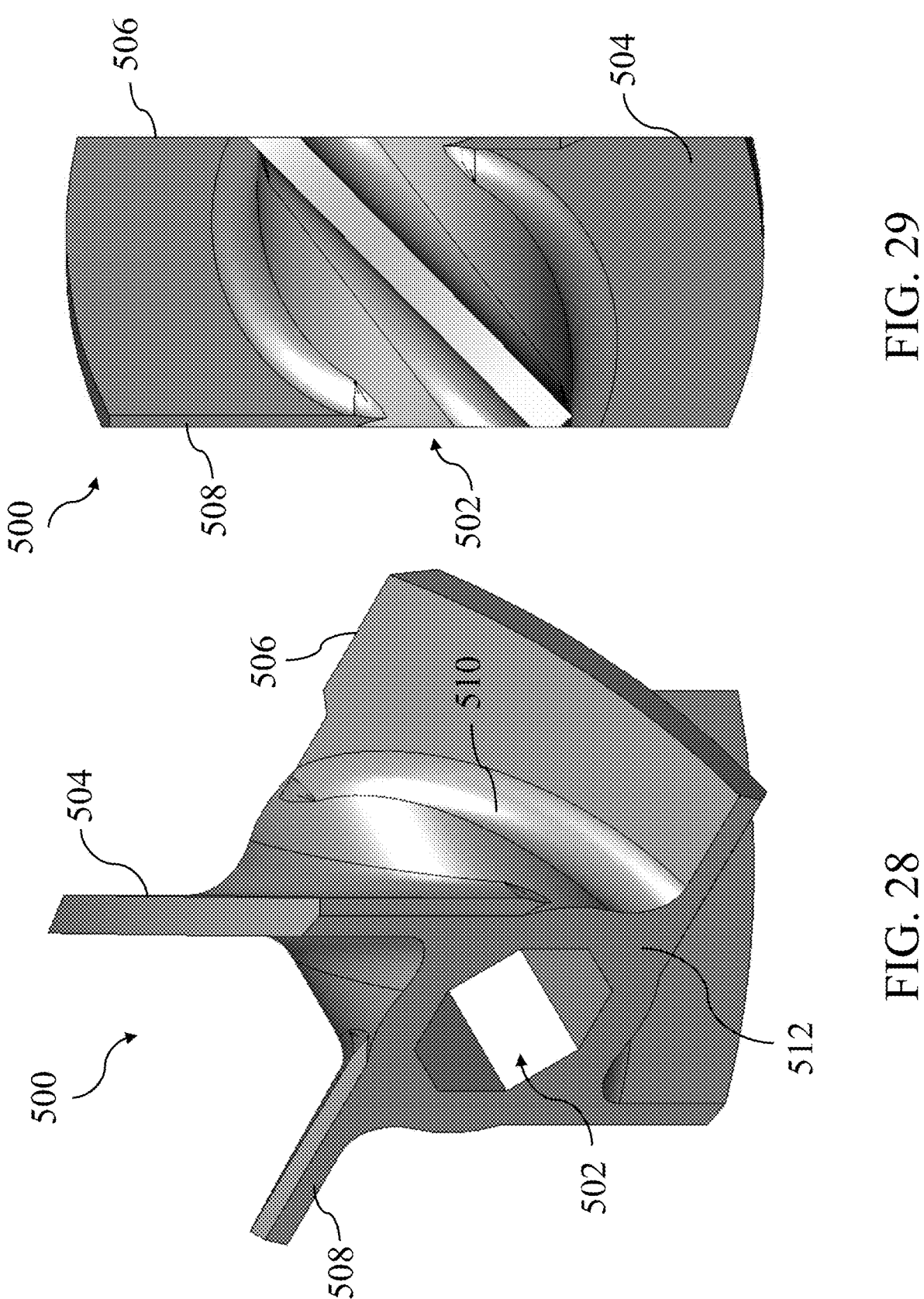
FIG. 28 depicts a front perspective view of a fourth exemplary modular mixing paddle configured for use with the shear-gap granulator assembly of FIG. 1.
FIG. 29 depicts a side elevational view of the fourth exemplary modular mixing paddle of FIG. 28.
Figures 32, 33:
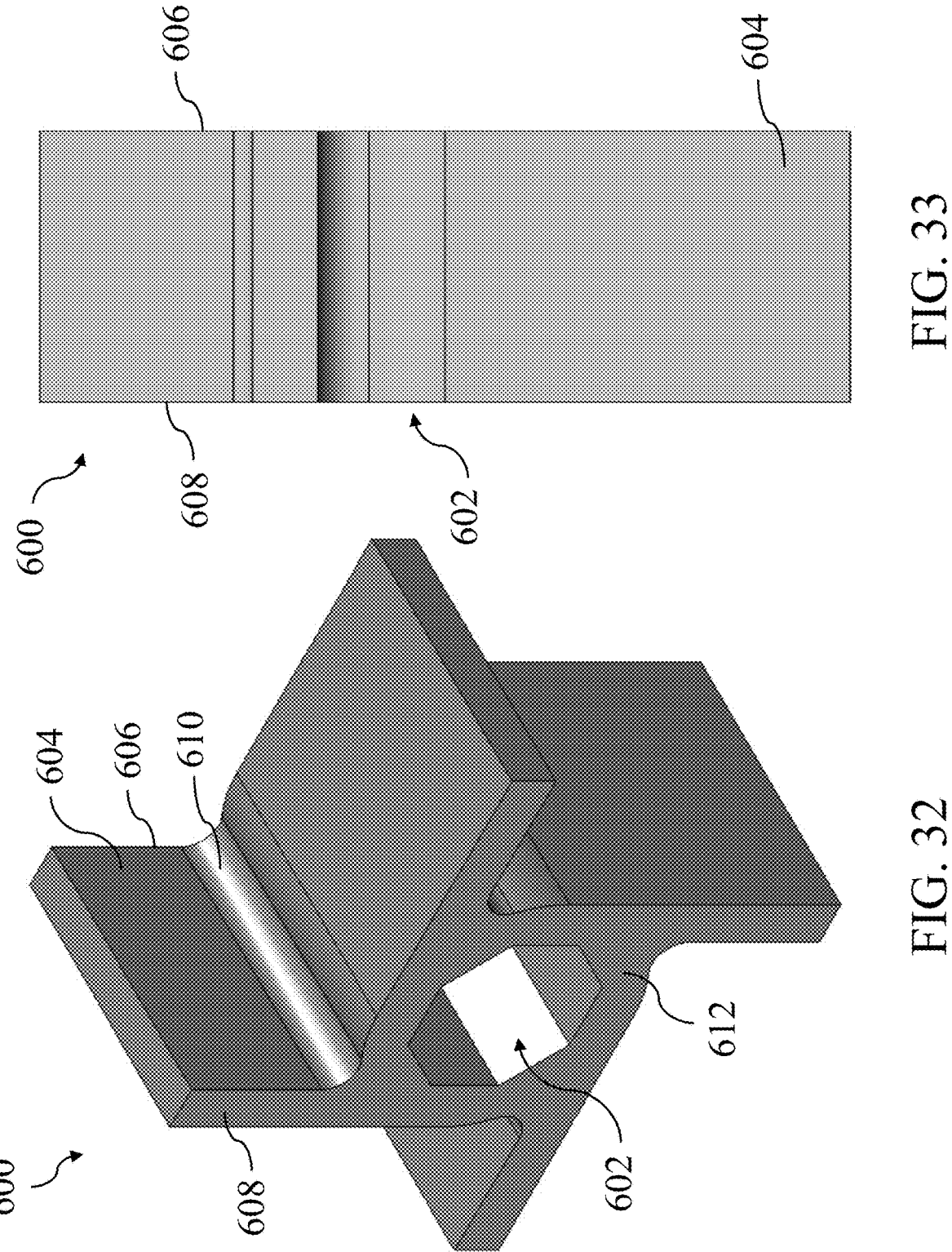
FIG. 32 depicts a front perspective view of a fifth exemplary modular mixing paddle configured for use with the shear-gap granulator assembly of FIG. 1.
FIG. 33 depicts a side elevational view of the fifth exemplary modular mixing paddle of FIG. 32.
Figures 34, 35:
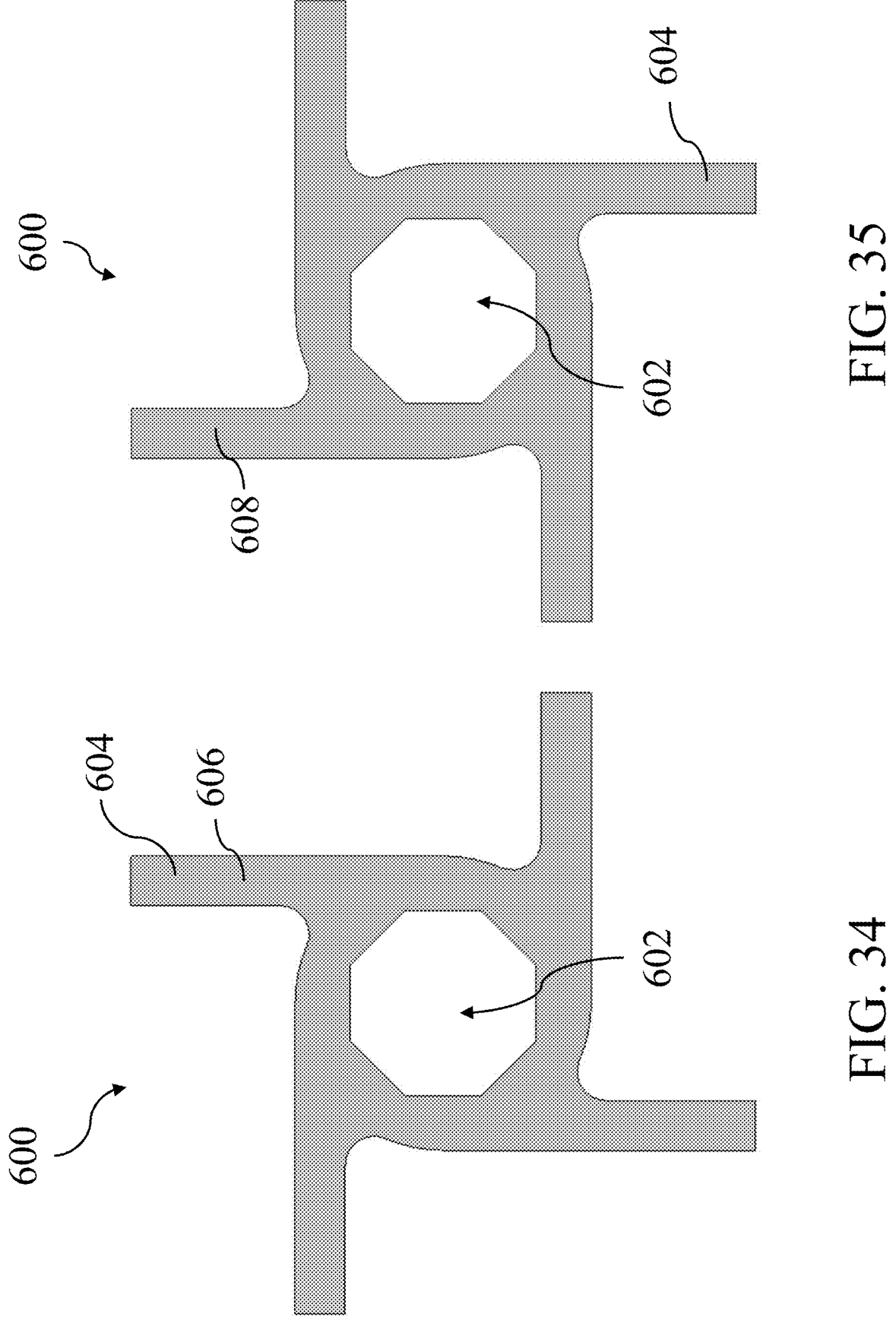
FIG. 34 depicts a front elevational view of the fifth exemplary modular mixing paddle of FIG. 32.
FIG. 35 depicts a rear elevational view of the fifth exemplary modular mixing paddle of FIG. 32.

Shown in FIGS. 15-18 is one example of a modular mixer paddle (200) which may be positioned within the basin (112) on a paddle shaft (130 or 132) (see, FIG. 19). The paddle shaft (130 or 132) (see, FIG. 19) extends through the central opening (202) of the mixer paddle (200). Mixer paddle (200) includes fins (204) each having a flat side (206) and an angled side (208) (see, FIG. 16). Further, each fin (404) includes one or more openings (214) therethrough. The openings (214) can be included to relieve the axial driving stress on the mixer paddle (200) before the reverse element (i.e., to reduce the severity of the reversal). For modularity and customization, mixer paddle (200) represents only one of several mixer paddles which may be arranged in axial alignment onto the same paddle shaft (130 or 132) during operation, as shown in FIG. 19. For example, as shown in FIG. 19, each paddle shaft (200, 300, 500, 500 and/or 600) is outfitted with four modular mixer paddles (200).

Shown in FIGS. 20-23 is another example of a modular mixer paddle (300) which may be positioned within the basin (112) on a paddle shaft (130 or 132) (see, FIG. 19). The paddle shaft (130 or 132) (see, FIG. 19) extends through the central opening (302) of the mixer paddle (300). Mixer paddle (300) includes fins (304) each having a flat side (306) and an angled side (308) (see, FIG. 20).

Shown in FIGS. 24-27 is another example of a modular mixer paddle (400) which may be positioned within the basin (112) on a paddle shaft (130 or 132) (see, FIG. 19). The paddle shaft (130 or 132) (see, FIG. 19) extends through the central opening (402) of the mixer paddle (400). Mixer paddle (400) includes fins (404) each having opposing flat sides (406, 408) (see, FIG. 25).

Shown in FIGS. 28-31 is another example of a modular mixer paddle (500) which may be positioned within the basin (112) on a paddle shaft (130 or 132) (see, FIG. 19). The paddle shaft (130 or 132) (see, FIG. 19) extends through the central opening (502) of the mixer paddle (500). Mixer paddle (500) includes fins (504) each having opposing flat sides (506, 508) (see, FIG. 29).

Shown in FIGS. 32-35 is another example of a modular mixer paddle (600) which may be positioned within the basin (112) on a paddle shaft (130 or 132) (see, FIG. 19). The paddle shaft (130 or 132) (see, FIG. 19) extends through the central opening (602) of the mixer paddle (600). Mixer paddle (600) includes fins (604) each having opposing flat sides (606, 608) (see, FIG. 33). In each of the modular mixer paddles (200, 300, 400, 500, 600) described above, the rounded internal surfaces (210, 310, 410, 510, 610) (e.g., where the fins (204, 304, 404, 504, 604) meet the inner base (212, 312, 412, 512, 612)) reduce or eliminate material build-up.

Figure 36:
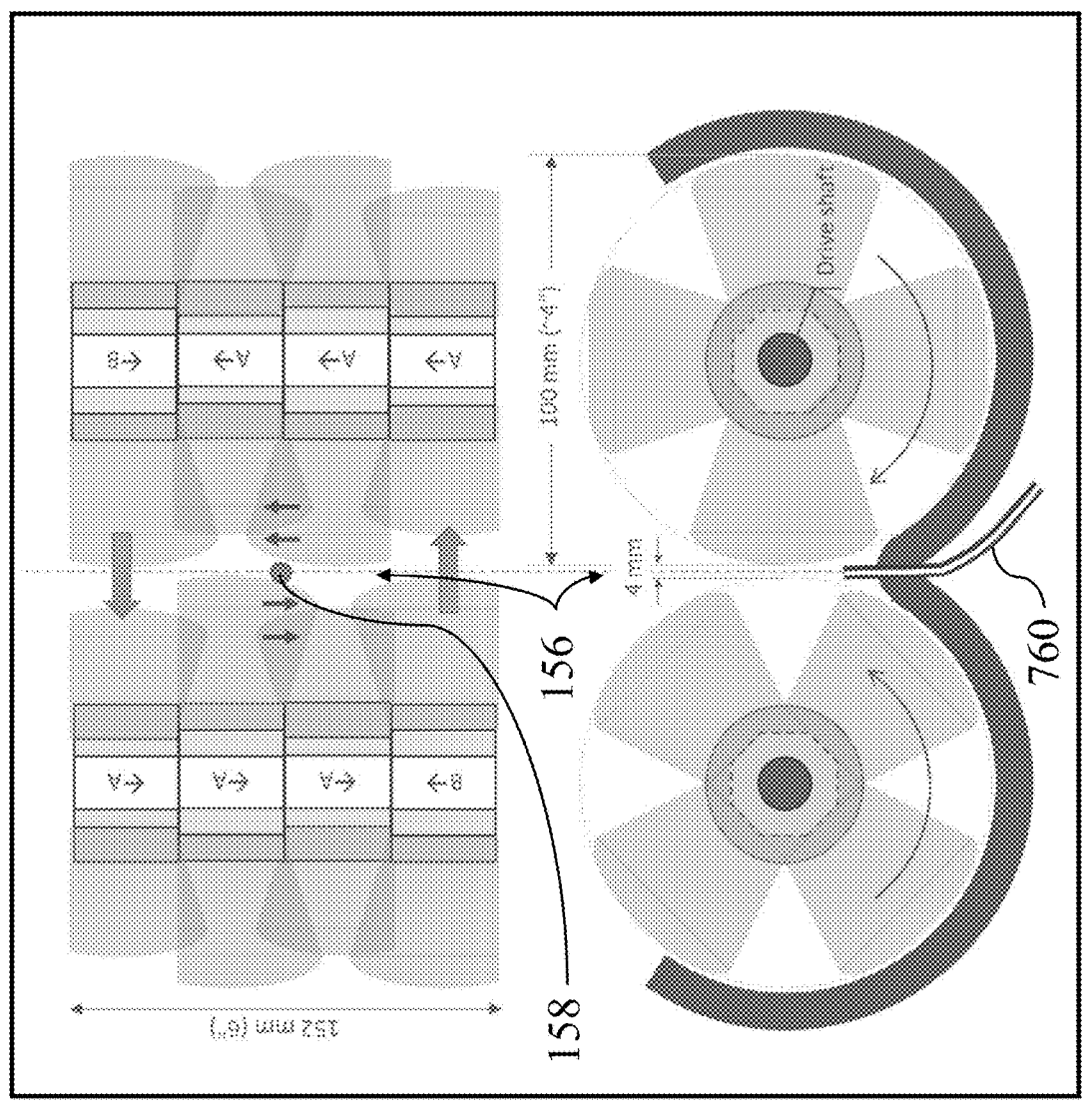
FIG. 36 depicts a top view (upper) compared with a side section view (lower) of a first example assembly of mixer paddles within the basin.

Shown in FIG. 36 is one exemplary modular mixing application using eight total mixer paddles to form a shear flow through the approximate center as measured between the tips of the paddle shafts (130, 132), which may include any one or any combination of modular mixer paddles (200, 300, 400, 500, 600).

Figure 39:
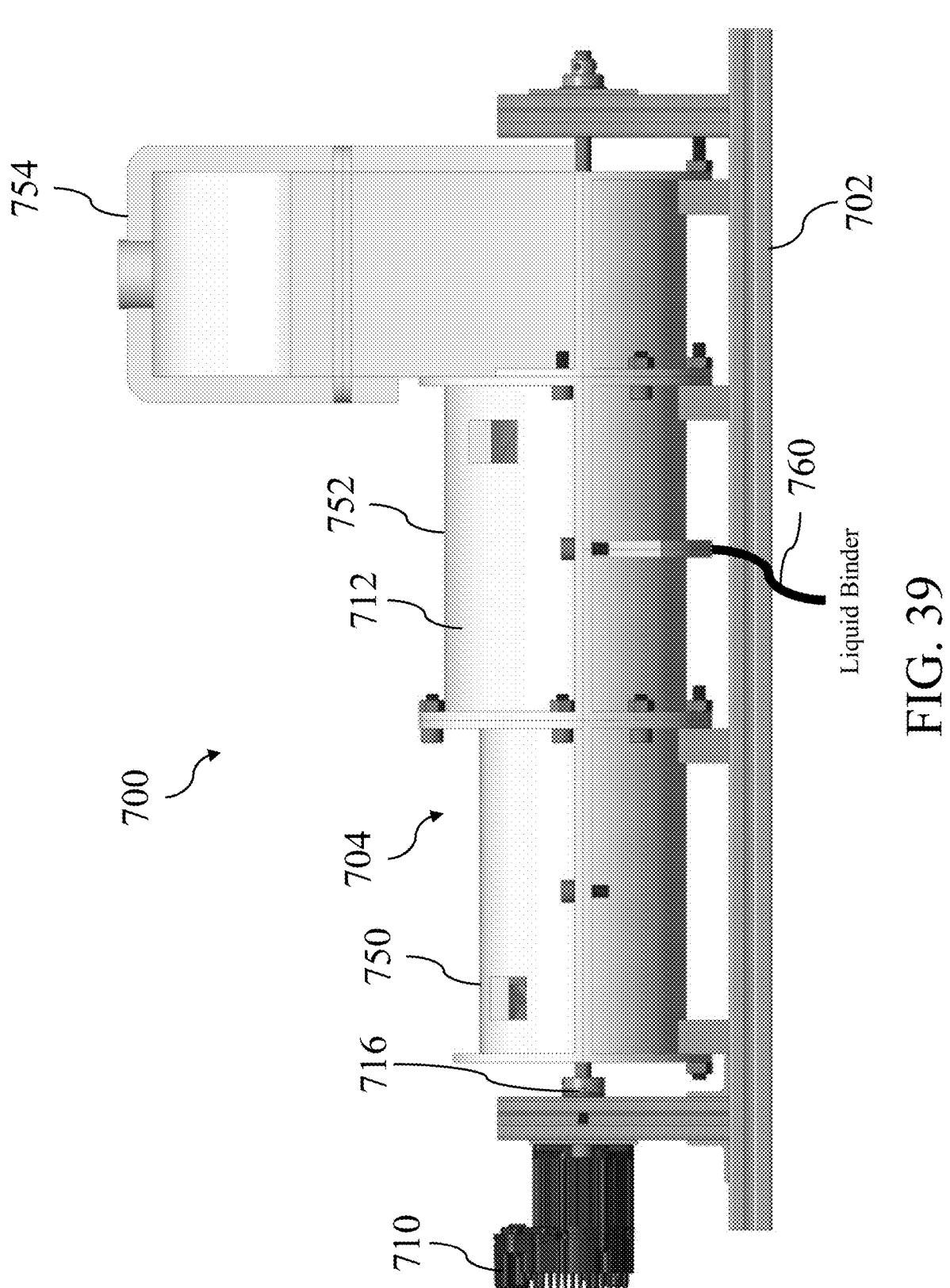
FIG. 39 depicts a front isometric view of another exemplary shear-gap granulator assembly, designed for continuous processing.
Figure 40:
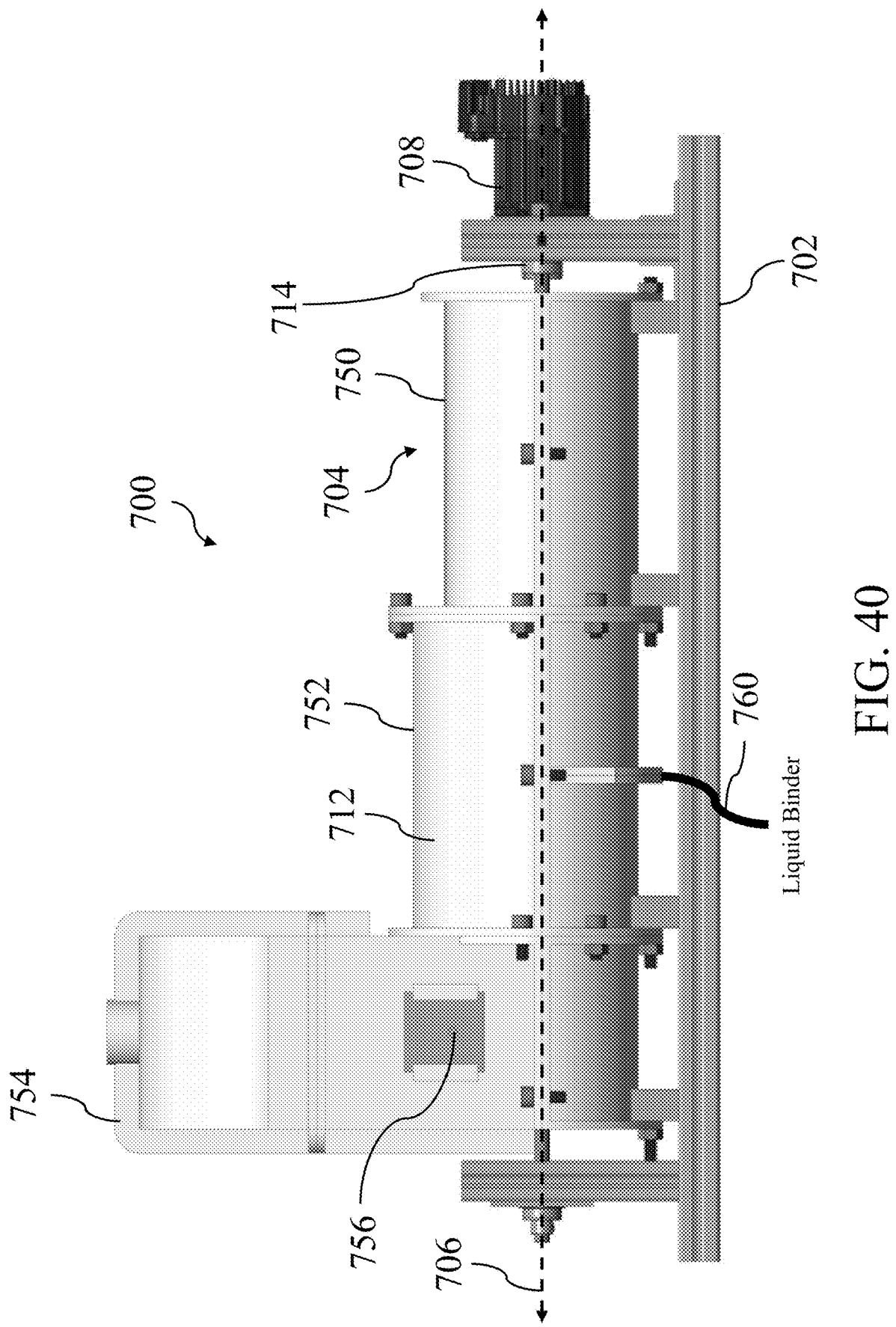
FIG. 40 depicts a rear isometric view of the shear-gap granulator assembly of FIG. 40.
Figure 41:
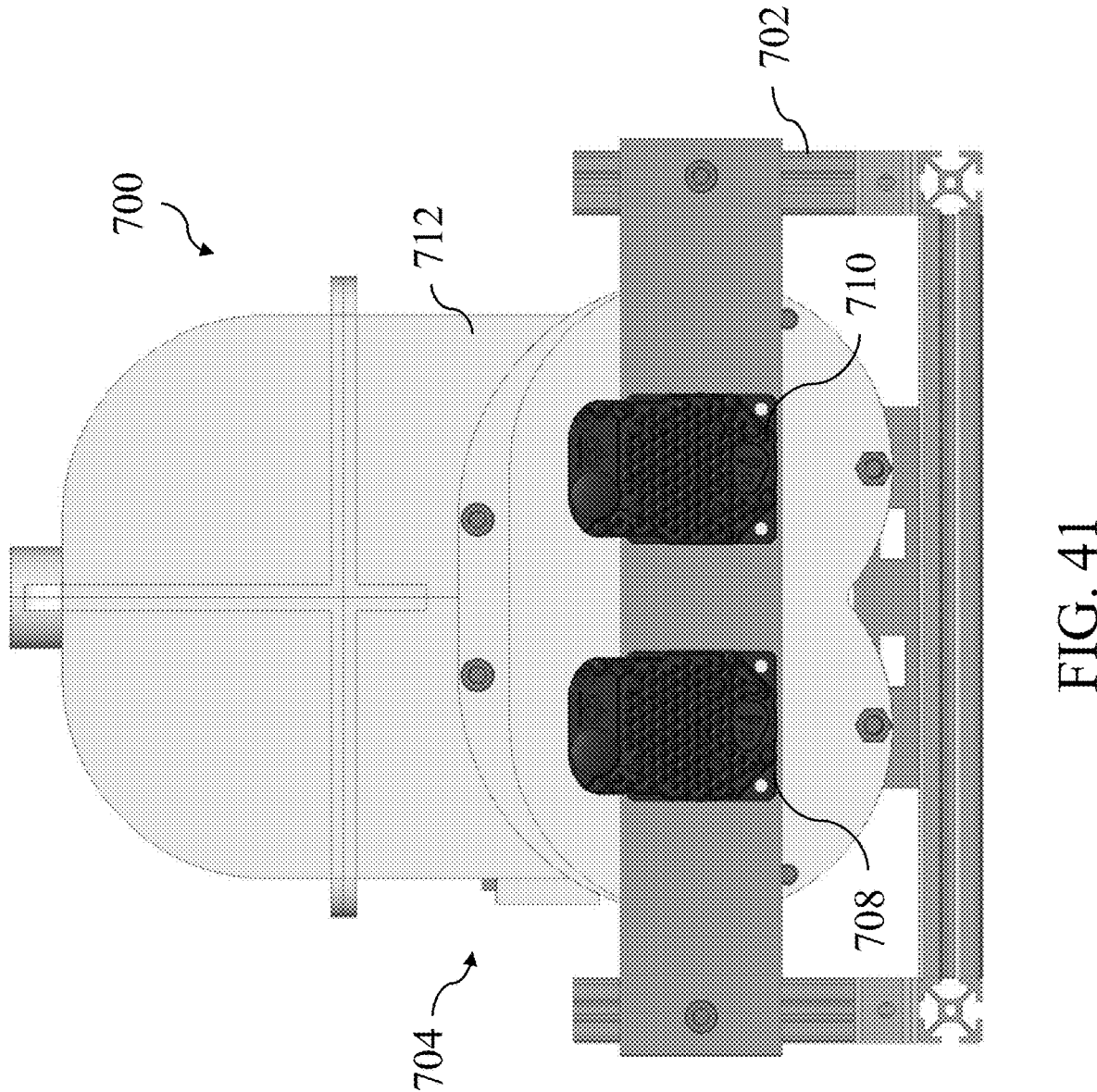
FIG. 41 depicts a left-side elevational view of the shear-gap granulator assembly of FIG. 40.
Figures 42, 43:
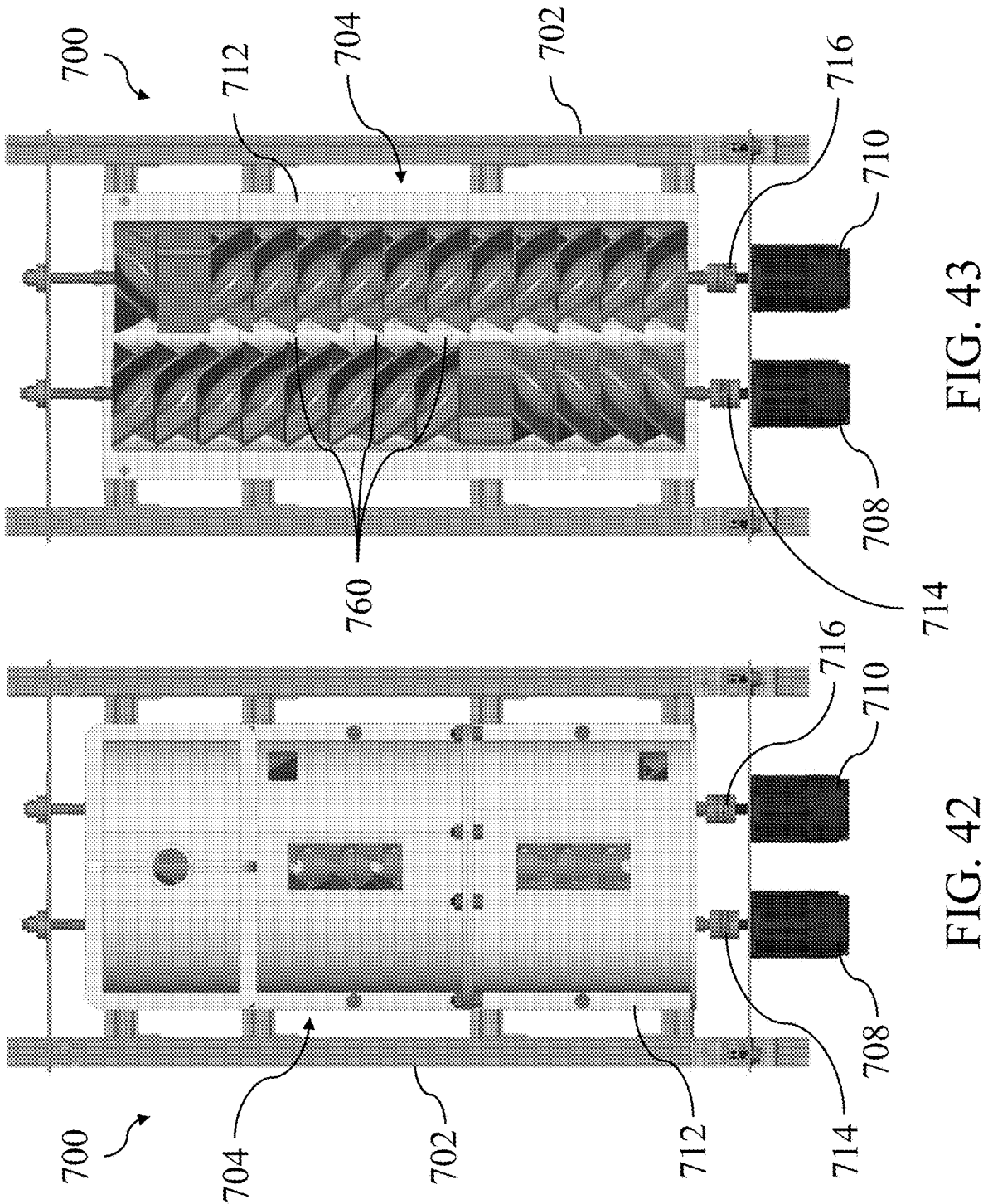
FIG. 42 depicts a top plan view of the shear-gap granulator assembly of FIG. 40, showing the top portion of the basin installed.
FIG. 43 depicts a top plan view of the shear-gap granulator assembly of FIG. 40, showing the top portion of the basin removed.
Figure 44:
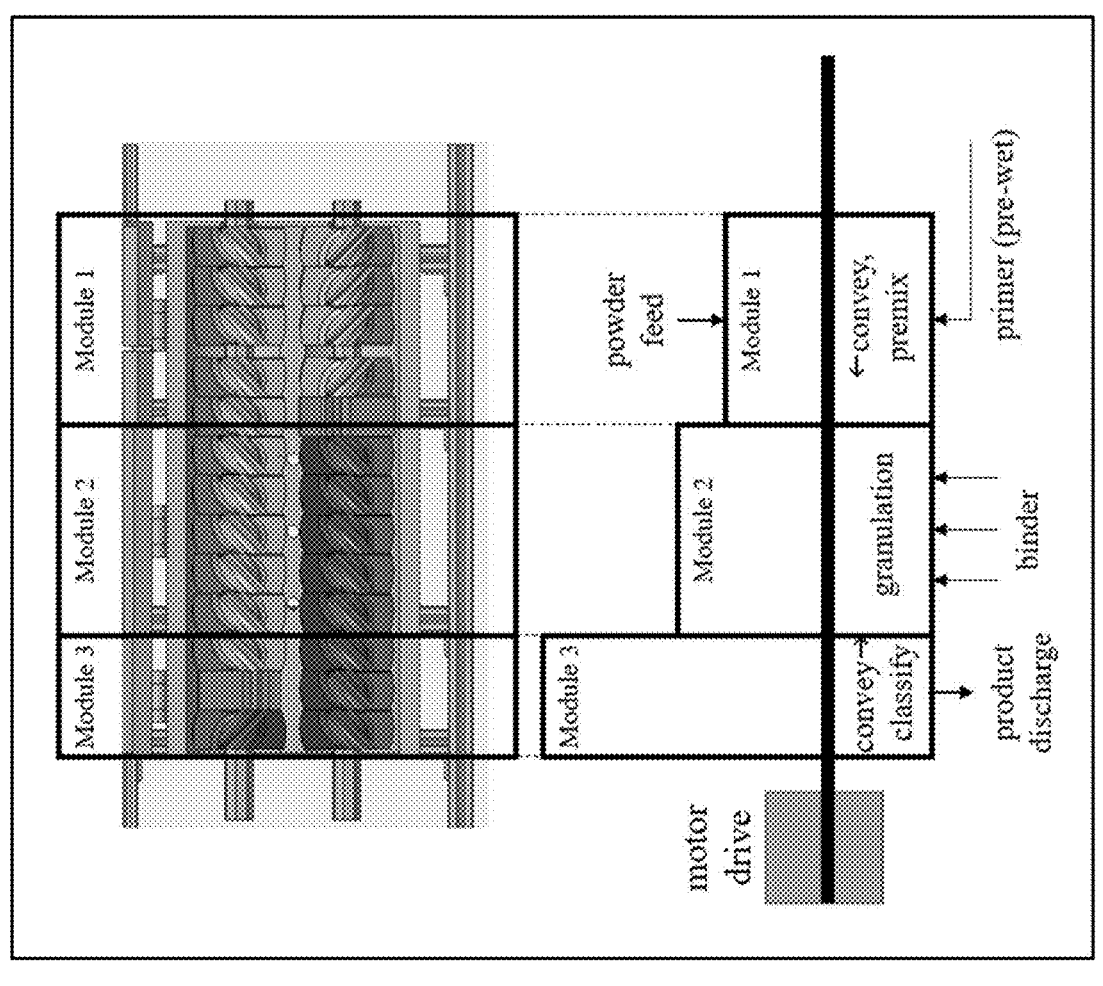
FIG. 44 depicts a schematic view of various modules which collectively form the basin of the shear-gap granulator assembly of FIG. 40.
Figure 45:
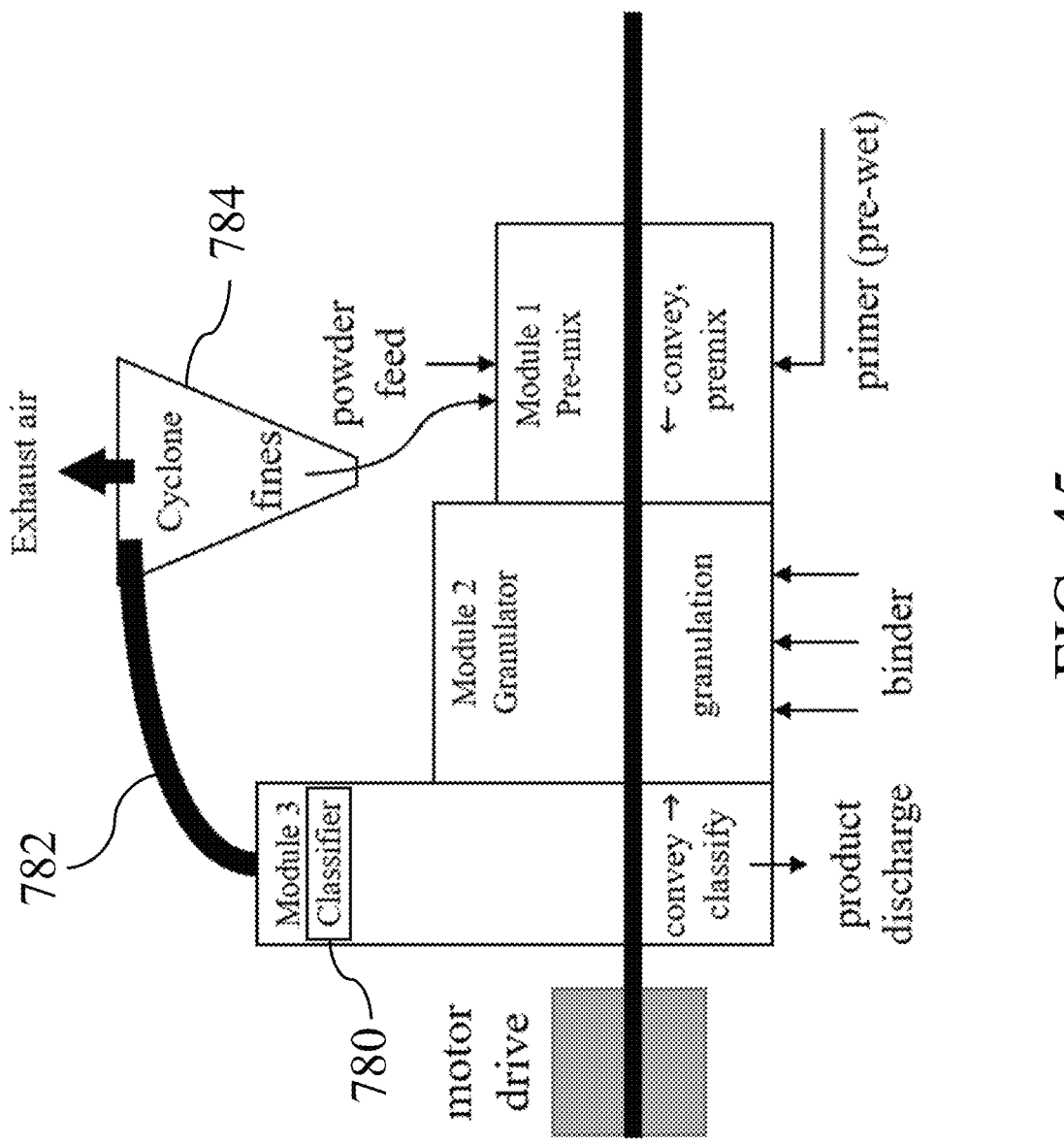
FIG. 45 depicts a schematic view showing additional functions of the modules of FIG. 45.

Advantageously, the granulating binder is introduced by a binder delivery system (see, FIGS. 39-40) into the material mixture at a particular position (158) during a mixing application, which is directly into a gap (156) defined between the mixer paddles driven by the first paddle shaft (e.g., paddle shaft (130) as shown in FIG. 19) and the mixer paddles driven by the second paddle shaft (e.g., second paddle shaft (132) as shown in FIG. 19) as opposed to being introduced onto the paddles or at or near an edge of the basin (112). The binder may be introduced having an upward (i.e., perpendicular to the axis of rotation of the paddle shafts) trajectory into the gap (156). In some embodiments, for a batch mixing operation as shown, one liquid binder stream may be utilized. However, in other embodiments, one or more additional liquid binder streams and associated delivery systems similarly configured as those illustrated may be included to additional shear gap introduction points to enable a continuous mixing operation.

The paddle shafts (130, 132), and therefore the paddles, are configured to axially rotate in opposite directions to form a shear band at the gap (156). Counter-rotation of the paddle shafts (130, 132) ensure that the impeller tips are each moving in an upward direction at the shear gap (156). Accordingly, the gap (156) introduces an intense extensional shear field that is present only in the gap (156) where the binder is added at position (158). Each paddle shaft (130, 132) can include a dimensionless Froude number (Fr) from about 1 to 20, or in some applications preferably from 2 to 10. Fr may be defined in this application as the ratio of centripetal acceleration induced by the paddle shaft rotation to gravitational acceleration, $Fr = \omega^2 \cdot R/g$, where w is the angular velocity of rotation in radians/second, R is the impeller tip radius in meters (see, FIG. 19), and g is the gravitational constant, i.e., 9.81 meters/second$^2$.

Figure 37:
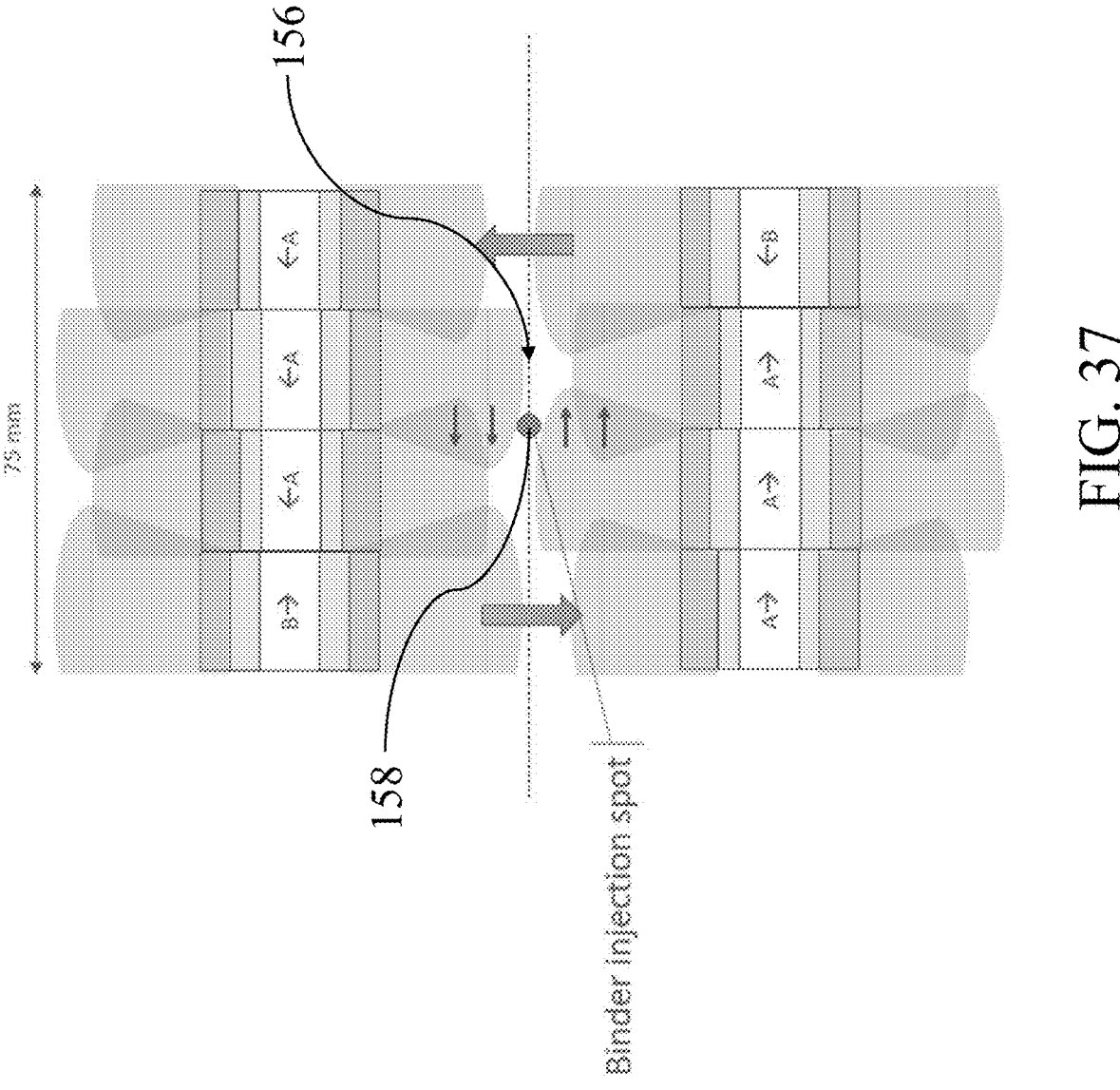
FIG. 37 depicts a top view of a second example assembly of mixer paddles within the basin.
Figure 38:
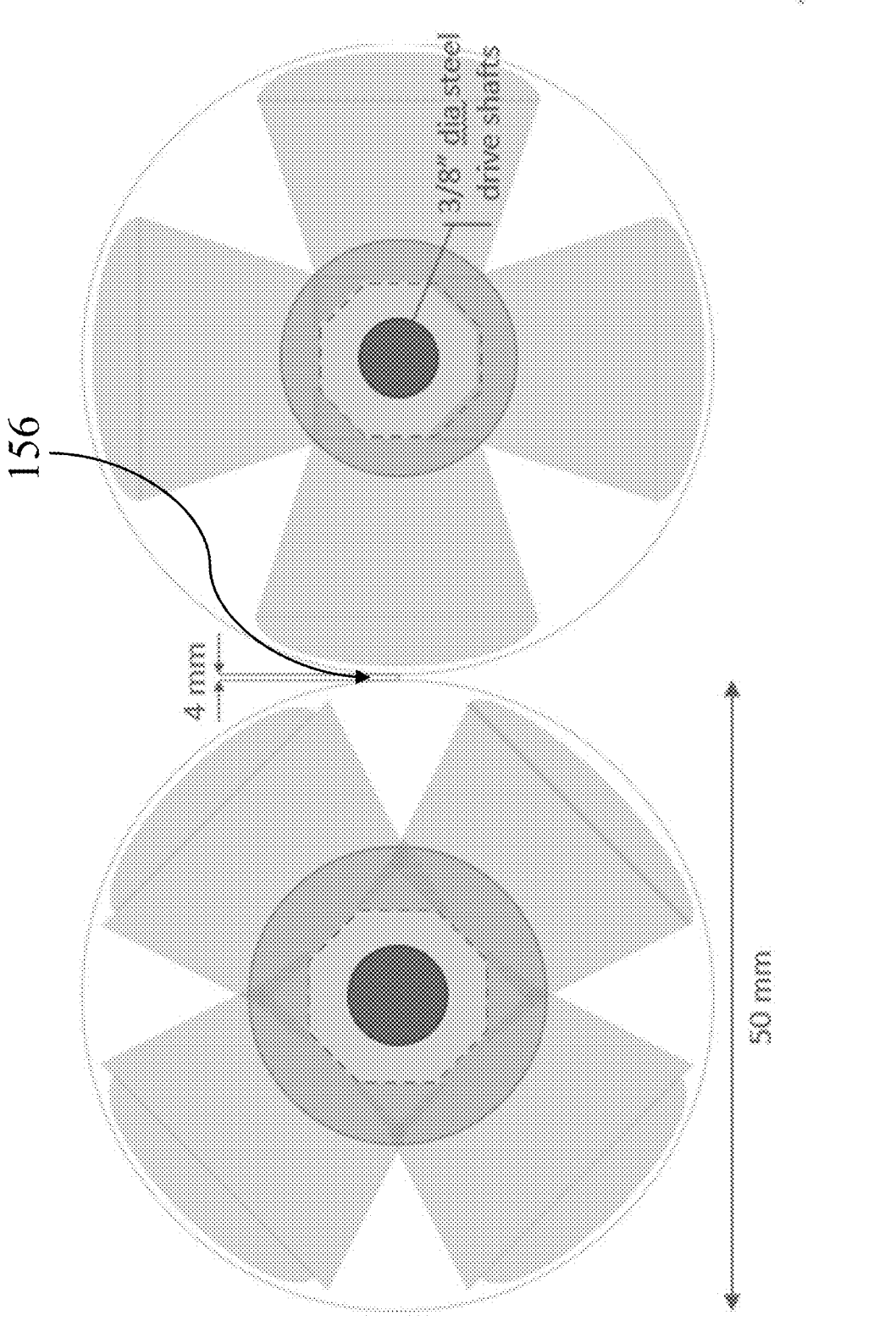
FIG. 38 depicts a side section view of the second example assembly of FIG. 37.

The described mixer paddles (200, 300, 400, 500, 600) are tailored to provide the intense shear field in the gap (156) without over-working the material elsewhere in the basin (112) as too much work and/or material compaction typically results in a lower-quality final product. The gap (156) can be, in certain applications, approximately four millimeters wide and is designed as a measure to create that increased shear flow. In some applications, the tip speed defined by the mixer paddles is faster than the injection speed of the binder. Shown in FIGS. 37-38 is another exemplary modular mixing application, similar to that of FIG. 36, but having different dimensions optimized for use in a different application.

While a rotatable mixing assembly is described, it should be understood that various advantageous aspects of the SGG, such as the basin design, the mixing paddle designs and their modularity, the shear gap defined by the positioning of the mixing paddles, and the positioning of the binder introduction, among other features, are applicable to and may be implemented into non-rotating mixing assemblies as well.

FIGS. 39-43 show a second embodiment of a shear gap granulator which includes the same general components as the SGG assembly (100) of FIG. 1. Particularly, SGG assembly (700) includes various components such as an outer frame (702) supporting an inner rotating assembly (704) that is configured to rotate about an axis (706) (see, FIG. 39) relative to the outer frame (702), and one or more motors (708, 710) each operatively coupled with an impeller, consisting of a plurality of mixer paddles (e.g., at least one of 200, 300, 400, 500, 600) (see, FIGS. 15-18, FIGS. 20-27, FIGS. 28-31, and FIGS. 32-35, respectively), within a basin (712). The basin (712) is supported by the inner rotating assembly (704). Particularly, the motors (708, 710) are configured to operatively couple with the mixer paddles (e.g., at least one of 200, 300, 400, 500, 600) (see, FIGS. 15-18, FIGS. 20-27, FIGS. 28-31, and FIGS. 32-35, respectively) within the basin (712) (see, FIG. 19) via respective shaft couplers (714, 716). SGG assembly (700) is configured to operate in the same way as SGG assembly (100).

Further, the basin (712) of the SGG assembly (700) may be collectively formed by a plurality of modules or zones each coupled to functionally operate together. For example, as shown in FIGS. 42-46, the basin (712) may be formed of three distinct modules. The first module (750) (see, FIGS. 39-40) can be configured to convey into the granulation zone and premix, optionally with a "pre-wet" primer. Particularly, this module (750) is where the raw powder feed is added, mixed, and conveyed into the granulation zone. As shown in FIG. 46, the first module (750) can be integrated with fines recycle from the air classifier. The second module (752) (see, FIGS. 39-40) can be configured to perform the shear-gap granulation as described herein. As shown in FIG. 46, binder may additionally be added directly into module 2 (752). Finally, the third module (754) (see, FIGS. 39-40) can be configured to classify and discharge the materials. Accordingly, the third module (754) may include an air classifier (780) therein, fluidly coupled via a tube (782) with a cyclone or filter separator (784) of elutriated fines, the fines of which may be returned to the shear-gap granulator segment via the raw powder charging segment. Particularly, the fines may be returned to the shear-gap granulator segment via backflow convection of the mixing paddle impellers located on the discharge side; the product that is discharged can pass through a counterflow of air that is being pulled from the classifier zone, though the cyclone (784) (see, FIG. 46) where elutriated fines are separated and returned to the first module (750). The air pull (shown as "exhaust air" in FIG. 46) can be achieved using a small vacuum. The purpose of the counterflow air classifier is to allow only particles larger than a threshold size to be discharged. The threshold is defined by the ratio of the particle's body force relative to the aerodynamic drag, so larger particles escape while finer particles stay inside. The achieved result is a narrower size distribution.

SGG Assembly (700) also includes a binder delivery system (760) (see, FIGS. 39-40) for selectively introducing the granulation binder into the shear gap as described above. The binder delivery system (760) may have one or more ingress locations, which may be configured to introduce the liquid binder at a controlled feed rate, providing a steady stream of binder in the gap. For each ingress location, the binder stream may be configured having a jet ratio from about 0.1 to 1.5, or in some applications preferably from 0.2 to 1.0, or in other applications more preferably 0.5 to 0.9. The jet ratio can be defined as the emergent jet velocity divided by the impeller tip speed.

In contrast to the batch SGG (100) of FIG. 1, SGG Assembly (700) may be configured for continuous operation having raw powder materials fed through the charging zone (750), optionally with recycle fines fed through the charging zone (750), into the mixer-granulation zone (752) where powder materials are optionally combined with the liquid binder to form granules, optionally with enough holdup in the mixer to enable internal recirculation through the mixer-granulation zone to achieve a desired granule size growth before discharge (754). The holdup of material in the mixer may be controlled by adjusting the weir height level of the discharge (756), and/or by adjusting the tilt angle of the frame.

Operationally, the SGG Assembly (700) may be started up as a batch process, first charging the required amount of raw powder, and then adding binder via the shear gap ingress (760) until the desired granulation is imminent, then transitioning to continuous operation by opening the discharge, and starting continuous raw powder feed while maintaining the binder flow. Optionally, raw powder materials may be fed into the SGG Assembly (700) by means of any powder feeding device, for example a loss-in-weight screw feeder, vibratory feeder, orifice flow device, or belt conveyor.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

11

We claim:

1. A mixing assembly, comprising:

(a) a mixing basin including first and second shafts extending therethrough, wherein the first and second shafts are arranged in parallel;

(b) a first plurality of mixing paddles positioned in an interior of the mixing basin, wherein each paddle of the first plurality of mixing paddles is coupled with the first shaft and configured to rotate about a first axis, wherein the first plurality of mixing paddles form a first rotational circumference defined as a rotational path of an outermost tip of the first plurality of mixing paddles;

(c) a second plurality of mixing paddles positioned in the interior of the mixing basin, wherein each paddle of the second plurality of mixing paddles is coupled with the second shaft and configured to rotate about a second axis, wherein the second plurality of mixing paddles form a second rotational circumference defined as a rotational path of an outermost tip of the second plurality of mixing paddles; and (d) at least one motor coupled with the first and second shaft and operable to rotate the first and second shafts in opposite axial directions to thereby rotate the first and second pluralities of mixing paddles, wherein the first rotational circumference is spaced apart from the second rotational circumference to define a gap therebetween;

(e) an inlet port on the mixing basin operable to transfer a liquid therethrough, wherein the inlet port is configured to deliver the liquid to a position within the gap while the first plurality of mixing paddles and the second plurality of mixing paddles rotate;

(f) a liquid binder delivery tube coupled with the inlet port, wherein the liquid binder delivery tube is configured to selectively provide the liquid to the inlet port.

2. The mixing assembly of claim 1, wherein the inlet port is configured to deliver the liquid to a position within the gap at a liquid jet speed, wherein the liquid jet speed is operable to maintain a jet feed ratio from 0.1 to 1.5, wherein the jet feed ratio is the liquid jet speed divided by a paddle tip speed defined by the outermost tips of the first plurality of mixing paddles and the second plurality of mixing paddles.

3. The mixing assembly of claim 2, wherein the liquid jet speed is operable to maintain a jet feed ratio from 0.5 to 0.9.

4. The mixing assembly of claim 1, wherein the mixing basin includes:

(a) a first module configured to receive materials into the first module, granulate the materials to form granulated materials, and convey the granulated materials away from the first module;

(b) a second module configured to convey the materials to the first module; and (c) a third module configured to receive the granulated materials and discharge the granulated materials from the mixing basin.

5. The mixing assembly of claim 4, wherein the third module includes an airflow classifier configured to separate the granulated materials into a first portion of materials and a second portion of materials.

6. The mixing assembly of claim 5, wherein the mixing basin includes a first discharge port and a second discharge port, wherein the first portion of materials is discharged from the first discharge port and the second portion of materials is discharged from the second discharge port.

7. The mixing assembly of claim 6, comprising a filter separator fluidly coupled with the second discharge port and the second module, wherein the filter separator is configured to transfer the second portion of materials into the second module.

8. The mixing assembly of claim 1, comprising:

(a) an outer frame defining a first outer frame end and a second outer frame end; and (b) an inner frame coupled with the outer frame via a first rotatable coupling at the first outer frame end and a second rotatable coupling at the second outer frame end, wherein the inner frame defines a first inner frame end adjacent the first outer frame end and a second inner frame end adjacent the second outer frame end, wherein the inner frame is configured to rotate 360-degrees relative to the outer frame via the first and second rotatable couplings;

wherein the mixing basin and at least one motor are coupled with the inner frame.

9. The mixing assembly of claim 1, wherein the gap is approximately 4 millimeters wide.

10. A mixing assembly, comprising:

(a) an outer frame defining a first outer frame end and a second outer frame end;

(b) an inner frame coupled with the outer frame via a first rotatable coupling at the first outer frame end and a second rotatable coupling at the second outer frame end, wherein the inner frame defines a first inner frame end adjacent the first outer frame end and a second inner frame end adjacent the second outer frame end, wherein the inner frame is configured to rotate 360-degrees relative to the outer frame via the first and second rotatable couplings, wherein the inner frame includes:

(i) at least one motor coupled with the second frame, wherein the at least one motor is operable to rotate a pair of shafts;

(ii) a mixing basin including a movable door, wherein the movable door is configured to permit access to an interior of the mixing basin, wherein each shaft of the pair of shafts extends in parallel through the interior of the mixing basin; and (iii) a plurality of paddles positioned in the interior of the mixing basin, wherein each paddle of the plurality of paddles is coupled with at least one shaft, wherein an activation of the at least one motor is configured to rotate the plurality of paddles in opposite direction for mixing a material within the mixing basin.

11. The mixing assembly of claim 10, wherein a first group of paddles of the plurality of paddles is coupled with a first shaft of the pair of shafts, wherein a second group of paddles of the plurality of paddles is coupled with a second shaft of the pair of shafts, wherein the first group of paddles define a first rotating circumference, wherein the second group of paddles defines a second rotating circumference, wherein the first and second rotating circumferences are spaced apart to form a shear flow gap.

12. The mixing assembly of claim 11, wherein rotation of each of the first shaft and the second shaft is at a Froude Number from 1.0 to 20.0.

13. The mixing assembly of claim 11, comprising:

(a) an inlet port on the mixing basin operable to transfer a liquid therethrough, wherein the inlet port is configured to deliver the liquid to a position within the shear flow gap while the first group of paddles and the second group of paddles rotate; and (b) a liquid binder delivery tube coupled with the inlet port, wherein the liquid binder delivery tube is configured to selectively provide the liquid to the inlet port.

14. The mixing assembly of claim 13, wherein the liquid binder includes a viscosity from 500 centipoise (cP) to 1,000,000 cP.

15. The mixing assembly of claim 10, further comprising a pin operable to selectively lock and unlock the rotatable coupling to thereby permit or restrict movement of the inner frame relative to the outer frame.

16. A granulator, comprising:

(a) a mixing basin including first and second shafts extending therethrough, the mixing basin including:

(i) a first module configured to receive materials into the first module, granulate the materials to form granulated materials, and convey the granulated materials away from the first module, (ii) a second module configured to convey the materials to the first module, and (iii) a third module configured to receive the granulated materials and discharge the granulated materials from the mixing basin;

(b) a first plurality of mixing paddles positioned in at least the second module of the mixing basin, wherein each paddle of the first plurality of mixing paddles is coupled with the first shaft and configured to rotate about a first axis, wherein the first plurality of mixing paddles form a first rotational circumference defined as the rotational path of an outermost tip of the first plurality of mixing paddles;

(c) a second plurality of mixing paddles positioned in at least the second module of the mixing basin, wherein each paddle of the second plurality of mixing paddles is coupled with the second shaft and configured to rotate about a second axis, wherein the second plurality of mixing paddles form a second rotational circumference defined as the rotational path of an outermost tip of the second plurality of mixing paddles, wherein there first rotational circumference is spaced apart from the second rotational circumference to define a shear flow gap therebetween; and (d) a liquid delivery tube fluidly coupled with the mixing basin and configured to selectively transfer a liquid to a position within the shear gap while the first plurality of mixing paddles and the second plurality of mixing paddles rotate.

17. The granulator of claim 16, wherein the third module includes an airflow classifier configured to separate the granulated materials into a first portion of materials and a second portion of materials.

18. The granulator of claim 17, wherein the mixing basin includes a first discharge port and a second discharge port, wherein the first portion of materials is discharged from the first discharge port and the second portion of materials is discharged from the second discharge port.

* * * * *